United States Patent
Rollinger et al.

(10) Patent No.: US 11,427,209 B2
(45) Date of Patent: Aug. 30, 2022

(54) SYSTEMS AND METHODS FOR VEHICLE SPEEDOMETER CALIBRATION

(71) Applicant: Ford Global Technologies, LLC, Dearborn, MI (US)

(72) Inventors: John Eric Rollinger, Troy, MI (US); Tyler Kelly, Plymouth, MI (US); Scott S. Thompson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 16/862,804

(22) Filed: Apr. 30, 2020

(65) Prior Publication Data
US 2021/0339757 A1 Nov. 4, 2021

(51) Int. Cl.
*B60W 40/105* (2012.01)

(52) U.S. Cl.
CPC ..... *B60W 40/105* (2013.01); *B60W 2520/105* (2013.01); *B60W 2520/28* (2013.01)

(58) Field of Classification Search
CPC .................................................. B60W 40/105
See application file for complete search history.

(56) References Cited

U.S. PATENT DOCUMENTS

| 5,526,263 | A | 6/1996 | Tanaka et al. |
| 5,579,230 | A | 11/1996 | Lin et al. |
| 7,599,779 | B2 | 10/2009 | Watanabe et al. |
| 8,336,364 | B2 | 12/2012 | Munko et al. |
| 2009/0205401 | A1* | 8/2009 | Munko ............... G01P 7/00 73/1.37 |
| 2010/0262396 | A1* | 10/2010 | Kircher ............. G01P 21/02 702/96 |
| 2012/0022780 | A1* | 1/2012 | Kulik ................ G01C 22/025 701/498 |
| 2014/0358397 | A1* | 12/2014 | Gao .................. B60T 8/172 701/90 |

(Continued)

FOREIGN PATENT DOCUMENTS

EP 2600161 A1 6/2013

OTHER PUBLICATIONS

"Using Accelerometers to Estimate Position and Velocity," CH Robotics Website, Available Online at http://www.chrobotics.com/library/accel-position-velocity, Available as Early as Nov. 16, 2012, 3 pages.

(Continued)

*Primary Examiner* — Jeff A Burke
*Assistant Examiner* — Jerrod Irvin Davis
(74) *Attorney, Agent, or Firm* — Vincent Mastrogiacomo; McCoy Russell LLP

(57) ABSTRACT

Methods and systems are provided for updating a relevant vehicle parameter in a vehicle so as to improve accuracy of a vehicle velocity determination. In one example, a method comprises integrating signals of a longitudinal acceleration sensor to obtain a first vehicle velocity and obtaining a second vehicle velocity from a wheel speed sensor between a first and a second reference point, and updating the relevant vehicle parameter as a function of a difference between a slope associated with the first vehicle velocity and another slope associated with the second vehicle velocity. In this way, accuracy of vehicle speed determination via one or more wheel speed sensors may be improved.

18 Claims, 9 Drawing Sheets

(56) References Cited

U.S. PATENT DOCUMENTS

2016/0169936 A1* 6/2016 Tehan .................. G01P 21/02
701/70
2020/0132192 A1* 4/2020 Oh ........................ F16H 63/40

OTHER PUBLICATIONS

"How do you use an accelerometer as a speedometer in a car?" Electrical Engineering Website, Available Online at https://electronics.stackexchange.com/questions/77030/how-do-you-use-an-accelerometer-as-a-speedometer-in-a-car, Available as Early as Aug. 2013, 2 pages.

"Speedometer Calibration Calculator," Tire Size Website, Available Online at https://tiresize.com/speedometer-calibration/. Available as Early as Apr. 19, 2016, 3 pages.

Rollinger, J et al., "Adjust Operational Parameters Based On Identified Roadway Rregularities," U.S. Appl. No. 16/863,198, filed Apr. 30, 2020, 44 pages.

"Graphical Analysis of One-Dimensional Motion," Lumen Learning Website, Available Online at https://courses.lumenlearning.com/physics/chapter/2-8-graphical-analysis-of-one-dimensional-motion/, Retrieved on Sep. 11, 2020, 23 pages.

* cited by examiner

SYSTEMS AND METHODS FOR VEHICLE SPEEDOMETER CALIBRATION

FIELD

The present description relates generally to methods and systems for correcting a vehicle speedometer based on data obtained from a longitudinal acceleration sensor.

BACKGROUND/SUMMARY

Speedometers rely on sensors to measure a rotational speed of a vehicle driveshaft and/or vehicle wheels, which is converted to vehicle speed via relevant equations. In some examples, the sensor may be an existing anti-lock braking system (ABS) sensor that measures vehicle speed. In such an example, an ABS control unit may measure and average the input from wheel speed sensors to obtain vehicle wheel speed. Then, vehicle speed may be derived from the wheel speed, based on a known tire diameter. Similar logic applies to the use of driveshaft rotational speed sensors.

However, such speedometer systems may in some cases become inaccurate. As one example, a rolling radius of vehicle tires may change over time, thus impacting the accuracy of vehicle speed measurements. As other examples, vehicle operators may modify their vehicles by one or more of changing tire size, changing final drive ratio, purposely altering tire pressure, etc. In such examples, inaccurate vehicle speeds may be reported to a vehicle operator, and to any other electronic controllers that rely on vehicle speed for operation, which is of course undesirable.

U.S. Pat. No. 8,336,364 teaches a method for calibrating wheel speed signals from wheel speed sensors during vehicle acceleration/deceleration, by integrating signals of at least one longitudinal acceleration sensor to yield a vehicle speed, and comparing the vehicle speed against wheel speed signals of individual wheel rpm sensors. When a difference falls outside of a predetermined range, a parameterized tire circumference of the associated wheel is adaptively recalibrated until the difference falls within the predetermined range.

However, the inventors herein have recognized potential issues with the above-referenced application. Specifically, there is a lack of disclosure of how the acceleration and deceleration events are selected for use in obtaining vehicle speed based on signals integrated via the at least one longitudinal acceleration sensor, and the inventors have recognized that only very particular vehicle acceleration/deceleration events can reliably be used to obtain vehicle speed by integrating longitudinal acceleration sensor data. For example, U.S. Pat. No. 8,336,364 teaches that data from the longitudinal acceleration sensor is collected when an error due to an offset of the longitudinal acceleration sensor has been compensated for, but there is no disclosure as to how the offset is compensated for, or even what the offset pertains to or is due to. U.S. Pat. No. 8,336,364 also discloses using acceleration/deceleration events for which the vehicle is not traveling uphill or downhill, and for which acceleration values fall within certain limits (e.g., not too high or too low). However, the inventors have recognized that stack-up errors in the integration of longitudinal acceleration sensor data may render a high likelihood of error in the estimate of vehicle speed if appropriate reference points for vehicle acceleration/deceleration events are not used to clearly define acceleration/deceleration events that can be used for robust analysis. Errors in the estimate of vehicle speed may result in erroneous adaptive recalibration of tire circumference, which may further exacerbate the issue that the calibration process attempts to resolve.

Thus, the inventors herein have developed systems and methods to at least partially address the above-mentioned issues. In one example, a method comprises with a vehicle at a first reference point, commencing integrating signals of a longitudinal acceleration sensor to obtain a first vehicle velocity and obtaining a second vehicle velocity from a wheel speed sensor, stopping obtaining the first and the second vehicle velocity responsive to the vehicle reaching a second reference point, and updating a relevant vehicle parameter as a function of a difference between the first vehicle velocity and the second vehicle velocity. In this way, vehicle velocity as indicated based on wheel speed sensor(s) may be improved.

As one example of the method, the first reference point may include the vehicle just beginning to accelerate from a vehicle-stopped condition, for example as soon as a controller of the vehicle receives an indication that the vehicle is traveling at greater zero miles per hour. In such an example, the second reference point may include a condition where a speed of the vehicle is greater than a first speed but less than a second speed, and wherein the speed is reached at a time since commencing integrating the signals of the longitudinal acceleration sensor to obtain the first vehicle velocity and obtaining the second vehicle velocity that is greater than a first time duration but less than a second time duration.

As another example, the first reference point may include the vehicle traveling within a threshold of a predetermined non-zero vehicle speed. In such an example, the second reference point may include the vehicle coming to a complete stop after a third time duration but before a fourth time duration since the vehicle was traveling within the threshold of the predetermined non-zero vehicle speed.

As another example, the method may include discarding data pertaining to the first and the second vehicle velocity in response to acceleration or deceleration of the vehicle not being monotonic between an entirety of the first reference point and the second reference point.

As another example, the relevant vehicle parameter may be a tire diameter. Additionally or alternatively, the relevant vehicle parameter may be a final drive ratio.

As another example, updating the relevant vehicle parameter may include changing the relevant vehicle parameter when a difference between a first slope of the first vehicle velocity between the first and the second reference points differs from a second slope of the second vehicle velocity between the first and the second reference points by more than a threshold difference. In such an example, the method may include maintaining the relevant vehicle parameter unchanged when the difference is less than the threshold difference.

As yet another example, the method may further comprise an indication that a steering wheel of the vehicle is maintained within a predetermined steering wheel angular range between the first reference point and the second reference point. Furthermore, the method may include an indication that a surface upon which the vehicle is traversing between the first reference point and the second reference point is within a predetermined threshold angle of a perfectly level surface.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
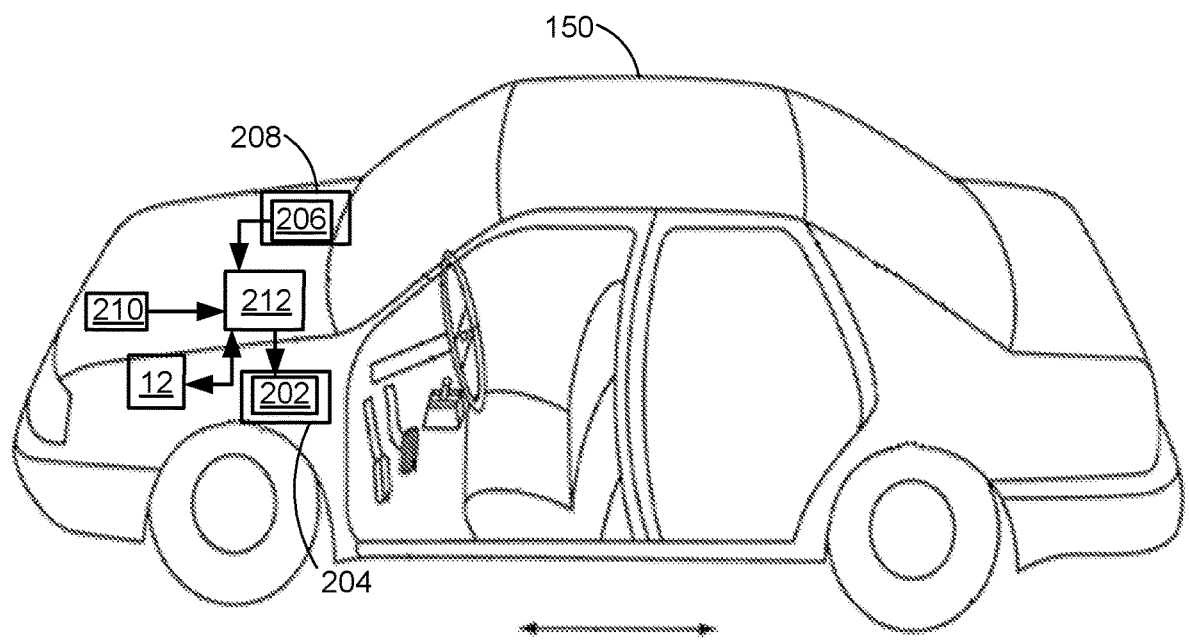
FIG. 1 shows a schematic representation of a vehicle illustrating example locations wherein longitudinal acceleration sensors may be placed on the vehicle.
Figure 3:
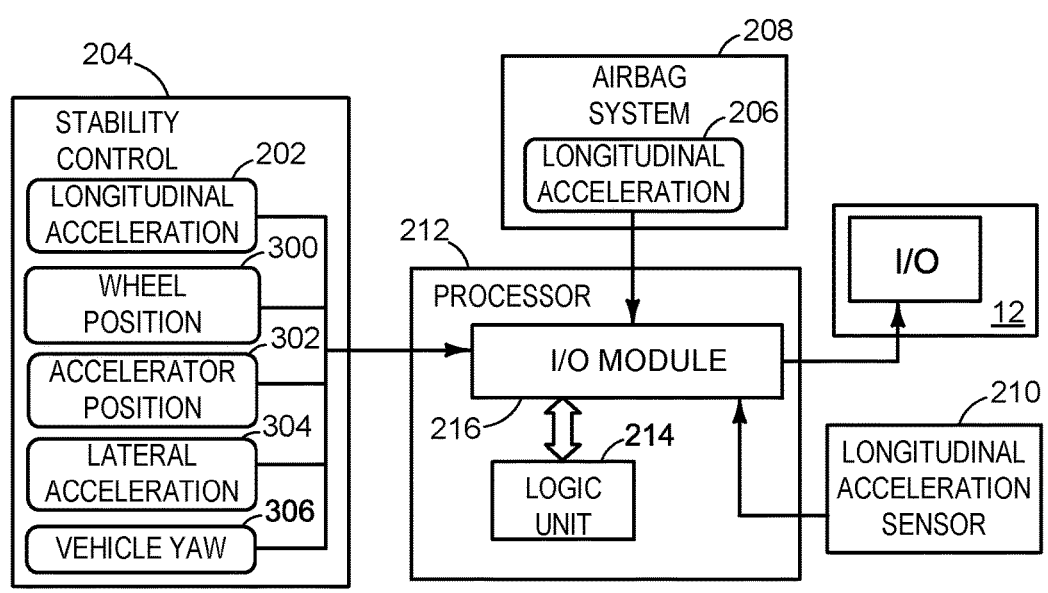
FIG. 3 shows a block diagram of systems and devices related to sensing acceleration in a vehicle.
Figure 2:
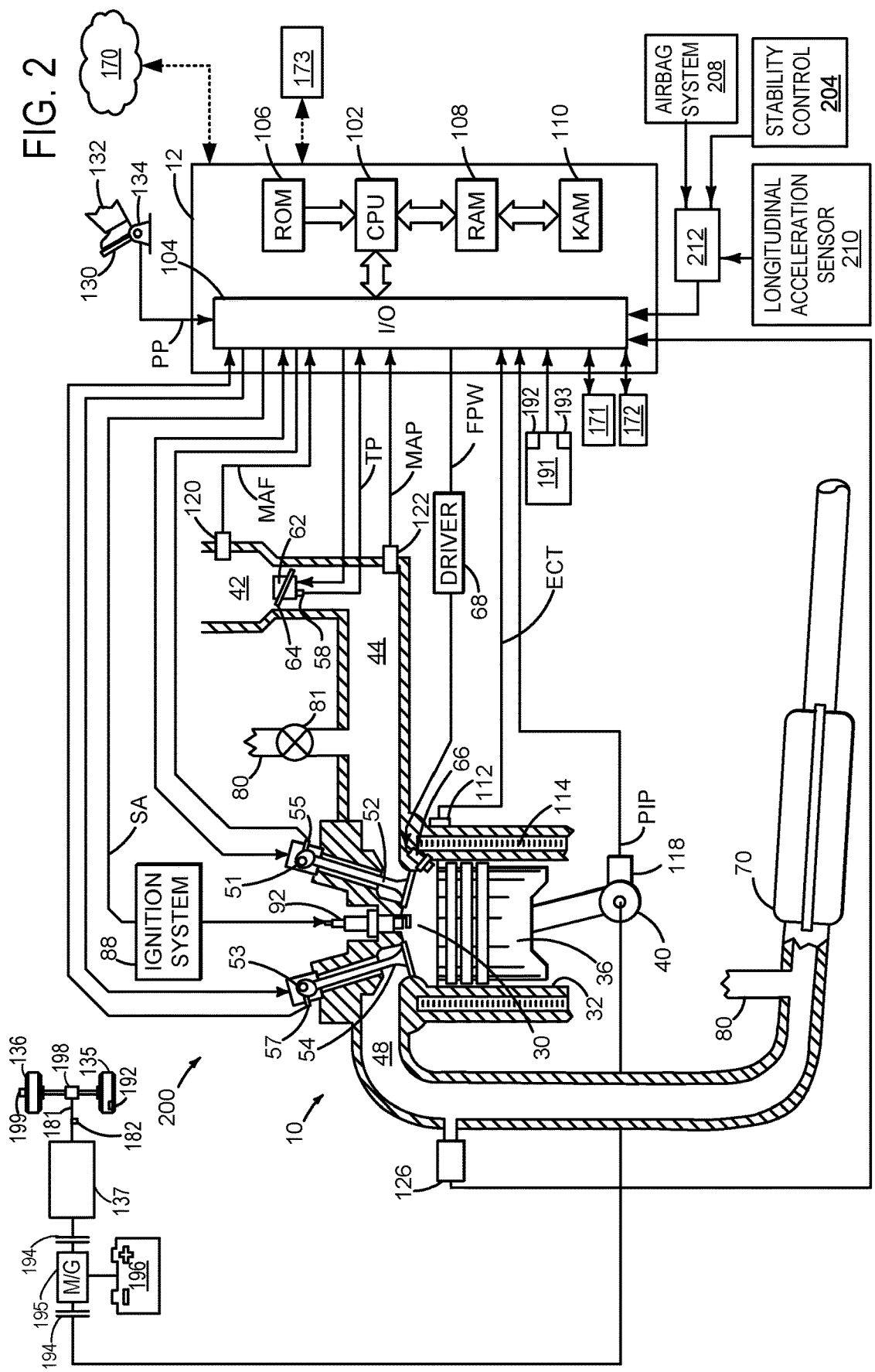
FIG. 2 shows a schematic diagram of an example internal combustion engine.

The following description relates to systems and methods for determining whether to update a relevant vehicle parameter, including but not limited to tire size, final drive ratio, etc., such that a measurement of vehicle speed via one or more wheel speed sensor(s) more accurately reflects an actual vehicle speed. Specifically, the systems and methods discussed herein relate to the use of longitudinal acceleration sensor data to infer vehicle speed based on integration of the longitudinal acceleration sensor data, and the comparison of such vehicle speed data to that retrieved from wheel speed sensor(s), to infer a calibration factor that may be used to update a relevant vehicle parameter. Accordingly, FIG. 1 depicts a vehicle that includes longitudinal acceleration sensors. FIG. 2 depicts a system that includes at least an engine, for propelling the vehicle of FIG. 1. FIG. 3 depicts various aspects of the vehicle as discussed at FIG. 1, in greater detail. It may be understood that the methodology discussed herein related to inferring vehicle speed from longitudinal acceleration sensor data may relate to strictly defined vehicle acceleration and deceleration events. Briefly, vehicle acceleration events where the vehicle accelerates from a stand-still, or first reference point, to a second reference point may in some examples be used to acquire longitudinal acceleration sensor data for the purposes of comparing vehicle speed estimates based on integrated longitudinal acceleration sensor data with that based on wheel speed sensor(s). As another example, vehicle deceleration events where the vehicle decelerates from a first reference point to a stand-still, or second reference point, may in some examples be used in similar fashion. In order to determine whether conditions are met for integrating longitudinal acceleration sensor data to infer vehicle speed for the purposes of comparison with vehicle speed inferred based on wheel speed sensor(s), a controller of the vehicle may request relevant information from a smart traffic system, such as the smart traffic system of FIG. 4. Briefly, the controller may request information from the smart traffic system pertaining to current and future status of a traffic light that the vehicle is expected to stop at, to determine whether conditions are met for acquiring and integrating longitudinal acceleration sensor data.

Figure 4:
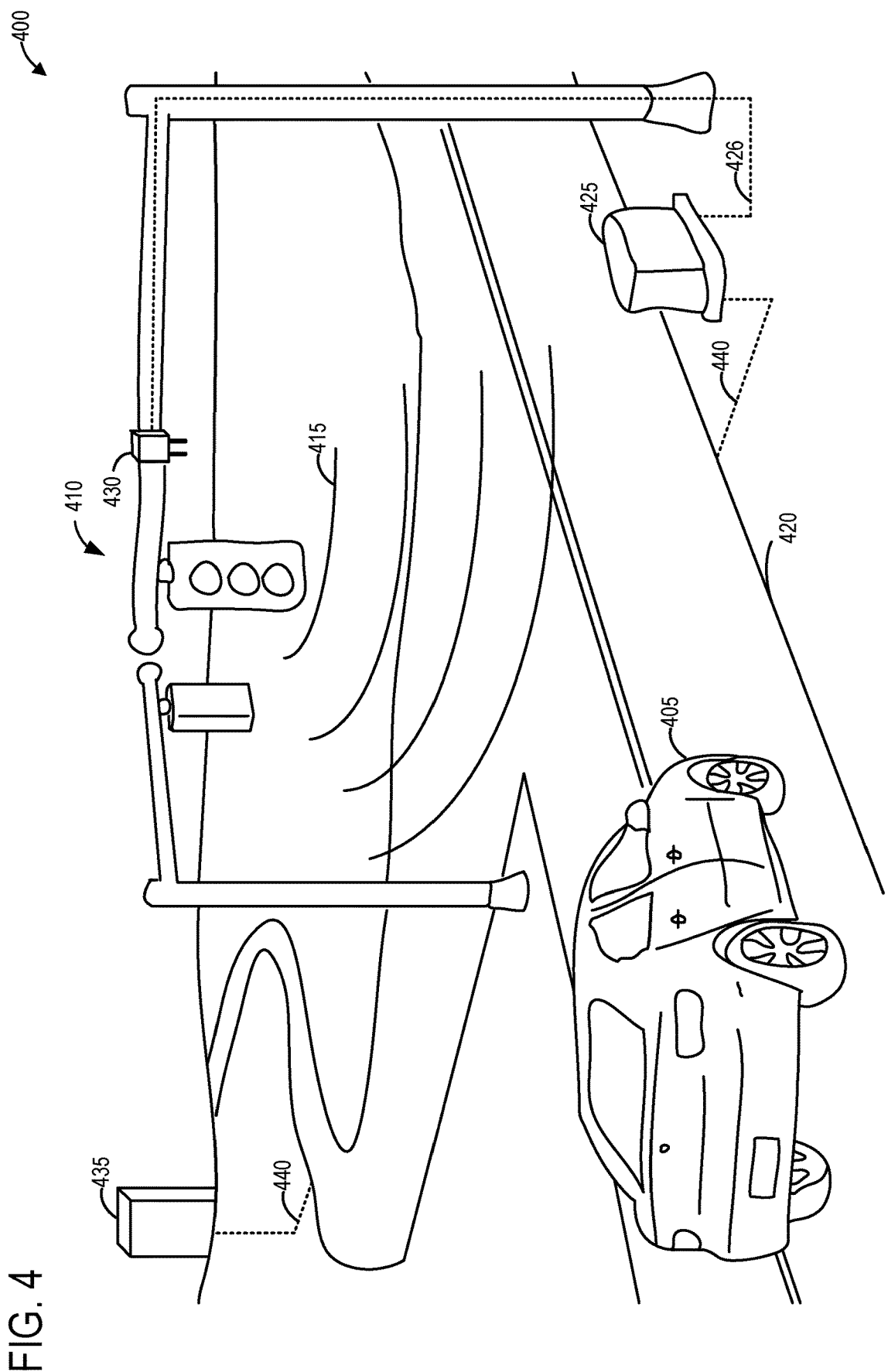
FIG. 4 schematically depicts an example of a smart traffic light system.
Figure 5:
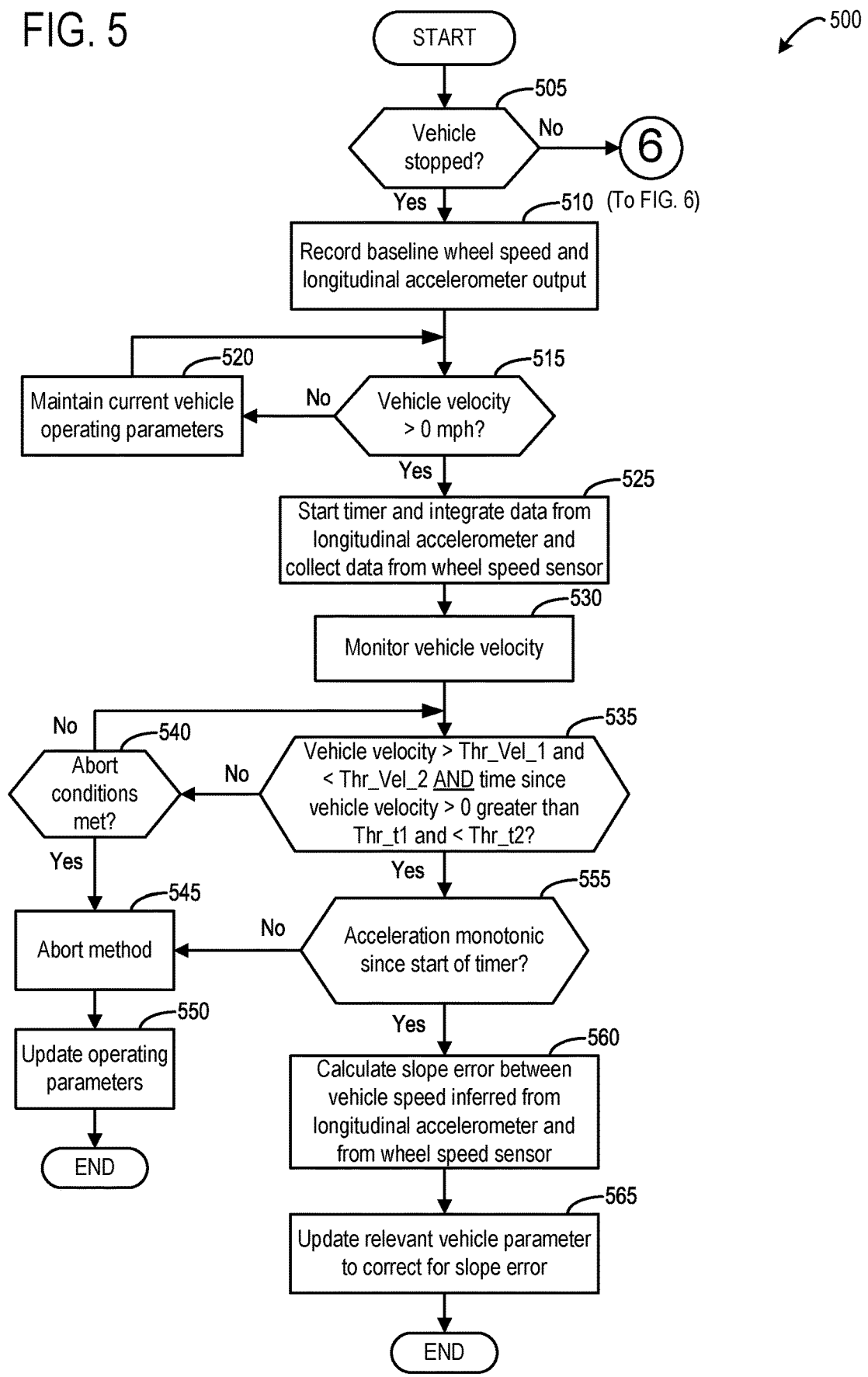
FIG. 5 depicts a high-level example method for determining a slope error between vehicle speed inferred from a longitudinal accelerometer and from wheel speed sensor(s), responsive to an acceleration event.
Figure 8:
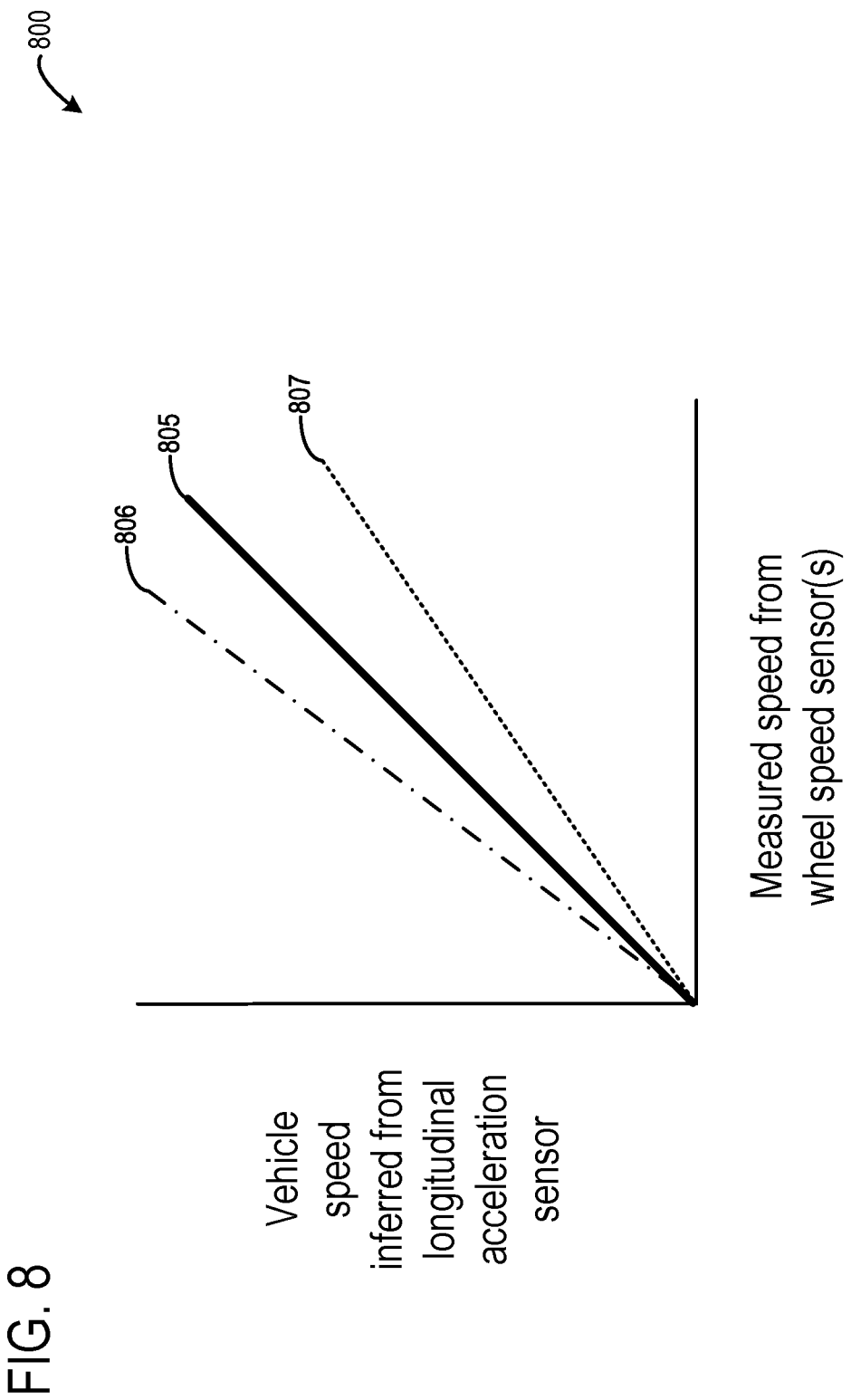
FIG. 8 schematically illustrates how a slope error between vehicle speed inferred from the longitudinal accelerometer and from wheel speed sensor(s) is determined, according to the method of FIG. 5.
Figure 9:
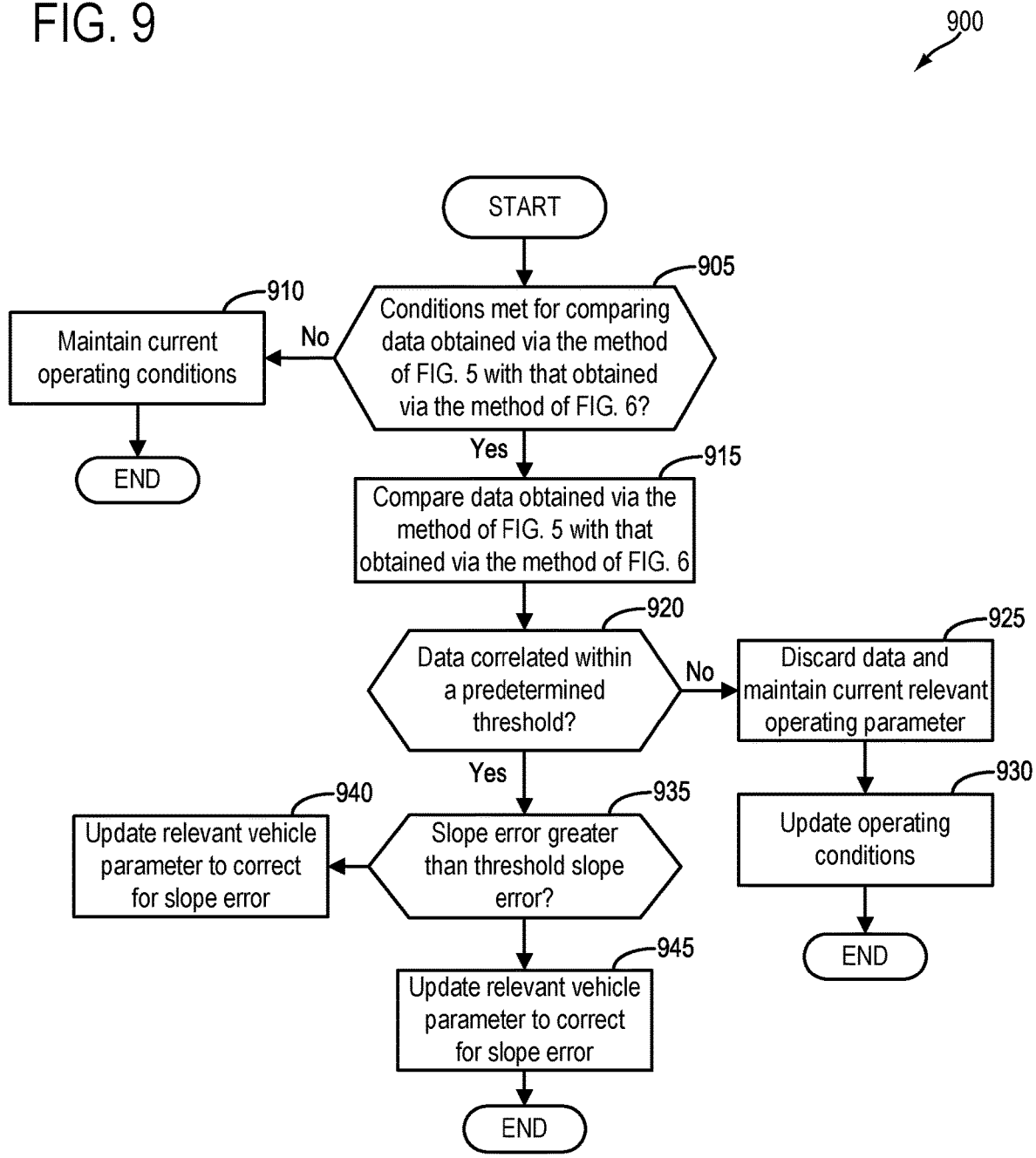
FIG. 9 depicts a high-level example method for updating a relevant vehicle operating parameter based on data acquired via both the methodology of FIG. 5 and FIG. 6.
Figure 10:
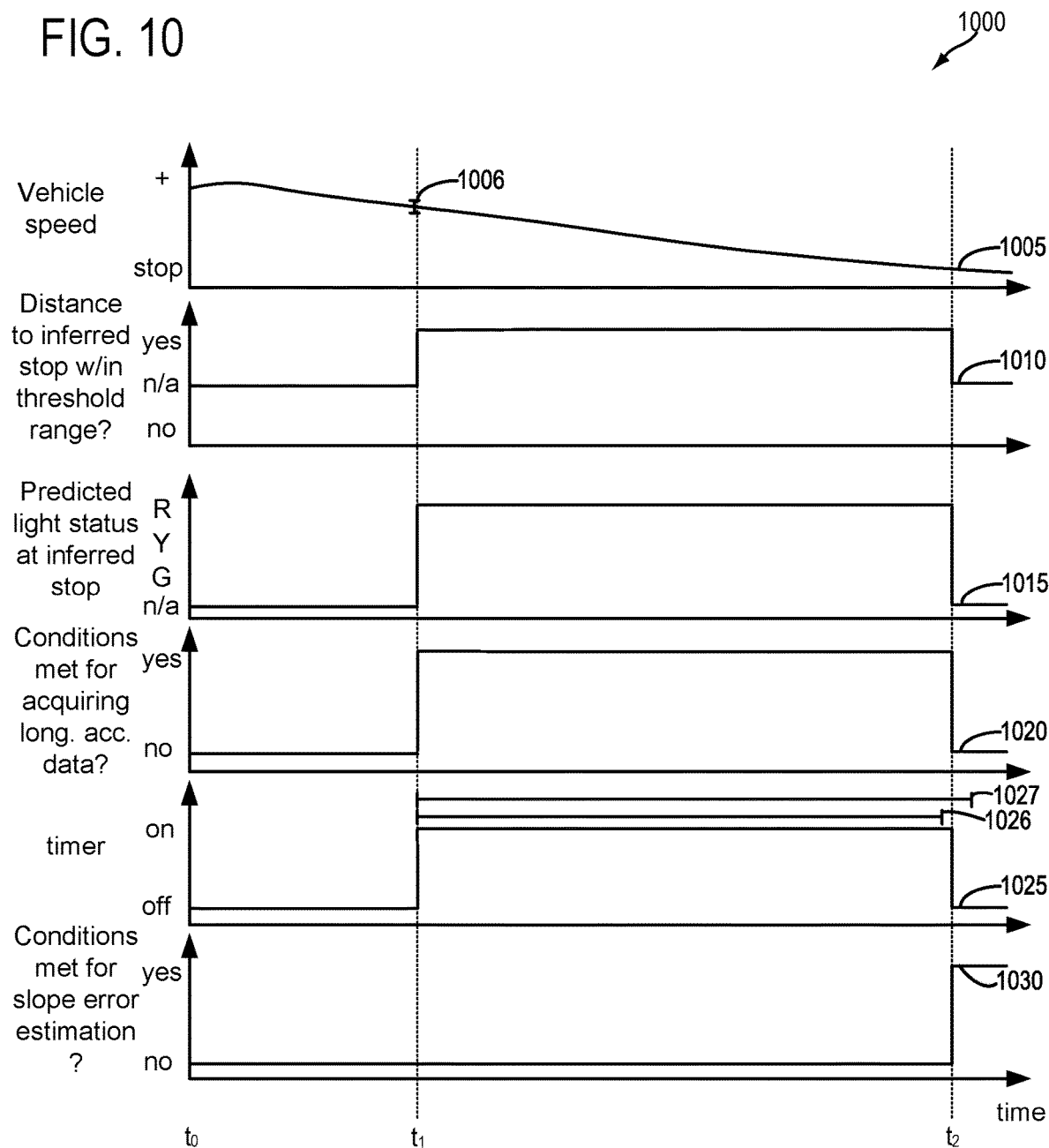
FIG. 10 depicts an example timeline for acquiring longitudinal accelerometer data and wheel speed data according to the method of FIG. 6.

Accordingly, FIG. 5 depicts an example methodology for acquiring vehicle speed estimates from both the longitudinal acceleration sensor and wheel speed sensor(s), for the purposes of determining whether to update a relevant vehicle parameter, during a vehicle acceleration routine from a completely stopped position. The methodology of FIG. 6 stems from that of FIG. 5, and includes conducting a similar methodology but during vehicle deceleration to a fully stopped positon. In order to rely on data acquired via the methodology of FIG. 5, specific conditions may have to be met, some of which are illustratively depicted at FIG. 7A. Similarly, to rely on data acquired via the methodology of FIG. 6, another set of specific conditions may have to be met, some of which are illustratively depicted at FIG. 7B. An example of how the data acquired via the methodology of FIG. 5 may be used to infer a slope error between a vehicle speed profile estimated from the wheel speed sensor(s) and a vehicle speed profile estimated from the integrated longitudinal acceleration sensor data, is depicted at FIG. 8, and similar methodology may be used for data acquired via the methodology of FIG. 6. FIG. 9 depicts a method for comparing data acquired via the methodology of FIG. 5 with that acquired via the methodology of FIG. 6, to determine whether to update a relevant vehicle parameter, or not. FIG. 10 depicts a prophetic example timeline for conducting the methodology of FIG. 6, based on information retrieved from the smart traffic system of FIG. 4.

FIG. 1 is a schematic illustration of a vehicle 150, and FIG. 2 is a schematic illustration of a system 200 that may be included in the vehicle 150. The vehicle 150 and the system 200 may have one or more longitudinal acceleration sensors (which are all example accelerometer sensors) in accordance with various embodiments. Various numbers and configurations of acceleration sensors may be used. One or more longitudinal acceleration sensors that may already be present on the vehicle 150 may be used, or one or more longitudinal acceleration sensors may be added to the vehicle 150. Three longitudinal acceleration sensors are illustrated in FIGS. 1 and 2. One longitudinal acceleration sensor 202 may be included as part of a stability control 204 for the vehicle 150. The stability control 204 may be an electronic stability control (ESC) or a rollover stability control (RSC), or the like. Another longitudinal acceleration sensor (e.g., 206 of FIG. 3) may be included as part of an airbag system 208 for the vehicle 150. Another longitudinal acceleration sensor 210 may be a longitudinal acceleration sensor added to the vehicle 150.

The processor 212 may be operatively coupled with an engine controller 12. The system 200 may include an ignition system 88 that may be configured to provide an ignition spark to combustion chamber 30 via spark plug 92 in response to a spark advance signal SA, or a spark retard signal SR from engine controller 12, under select operating modes, and in accordance with instructions from the processor 212.

Alternatively, the processor 212, and/or functions described herein may be included as part of the engine controller 12, and may in particular be included as part of a microprocessor unit (CPU) 102.

Engine controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus.

Engine controller 12 may receive various signals from sensors coupled to engine 10, in addition to those signals previously, and hereinafter, discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor 62; and absolute manifold pressure signal, MAP, from sensor 122. Engine speed signal, RPM, may be generated by engine controller 12 from signal PIP. Barometric pressure may also be sensed (sensor not shown) for processing by controller 12.

FIG. 2 illustrates one cylinder of multi-cylinder engine 10, which is included in a propulsion system of vehicle 150. Engine 10 may be controlled at least partially by a control system including the engine controller 12 and by input from a vehicle operator 132 via an input device 130. In this example, input device 130 includes an accelerator pedal and the pedal position sensor 134 for generating a proportional pedal position signal PP. Engine 10 includes combustion chamber 30 and cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. Combustion chamber 30 is shown communicating with intake manifold 44 and exhaust manifold 48 via respective intake valve 52 and exhaust valve 54.

In this example, intake valve 52 and exhaust valves 54 may be controlled by cam actuation via respective cam actuation systems 51 and 53. Cam actuation systems 51 and 53 may each include one or more cams and may utilize variable valve timing (VVT) which includes one or more of cam profile switching (CPS), variable cam timing (VCT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation (EVA). For example, cylinder 30 may alternatively include an intake valve controlled via electric valve actuation and an exhaust valve controlled via cam actuation including CPS and/or VCT systems.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system (not shown) which may include a fuel tank, a fuel pump, fuel lines, and fuel rail. The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Further, in the present example engine 10 includes an EGR conduit 80 to direct exhaust gases, upstream of converter 70 and/or downstream of converter 70 back to the intake manifold 44. In further examples, EGR conduit 80 may not be coupled to intake 42 upstream of throttle 64. Further, EGR conduit 80 includes an EGR valve 81 which meters flow through the EGR conduit, and may be a continuously variable valve or a two position on/off valve.

In a preferred aspect of the present description, engine position sensor 118 produces a predetermined number of equally spaced pulses every revolution of the crankshaft from which engine speed (RPM) can be determined. In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start alternative strategy may be used to assure that the engine is rotating in a forward direction.

In some examples, engine 10 may be included in a hybrid electric vehicle (HEV) or plug-in HEV (PHEV), with multiple sources of torque available to one or more vehicle wheels 135. In the example shown, vehicle 150 may include an electric machine 195. Electric machine 195 may be a motor or a motor/generator. Crankshaft 40 of engine 10 and electric machine 195 are connected via a transmission 137 and final drive 198 to vehicle wheels 135 when one or more clutches 194 are engaged. In the depicted example, a first clutch is provided between crankshaft 40 and electric machine 195, and a second clutch is provided between electric machine 195 and transmission 137. Controller 12 may send a signal to an actuator of each clutch 194 to engage or disengage the clutch, so as to connect or disconnect crankshaft 40 from electric machine 195 and the components connected thereto, and/or connect or disconnect electric machine 195 from transmission 137 and the components connected thereto. Transmission 137 may be a gearbox, a planetary gear system, or another type of transmission. The powertrain may be configured in various manners including as a parallel, a series, or a series-parallel hybrid vehicle. Transmission 137 may be coupled to final drive 198 via output shaft 181. In some examples, an output shaft speed sensor 182 may be coupled to output shaft 181, for monitoring a speed at which the output shaft is rotating. While not explicitly illustrated, it may be understood that output shaft speed sensor 182 may be in electrical communication with controller 12, for providing controller 12 with information pertaining to the speed of the output shaft.

Electric machine 195 may receive electrical power from a traction battery 196 to provide torque to vehicle wheels 135. Electric machine 195 may also be operated as a generator to provide electrical power to charge energy storage device 196 (e.g., battery, or traction battery), for example during a braking operation.

In some examples, system 200 may include an antilock brake system (ABS) 191. The ABS may include wheel speed sensors 192, for example. The ABS may further include at least two hydraulic valves (not shown) within the brake hydraulics (not shown). Controller 12 may monitor rotational speed of each wheel, and responsive to detection of a wheel rotating significantly slower than the others, the ABS 191 may be controlled to reduce hydraulic pressure to the brake (not shown) at the affected wheel, thus reducing the braking force on said wheel. Alternatively, responsive to detection of a wheel rotating significantly faster than the others, the ABS 191 may be controlled to increase hydraulic pressure to the brake at the affected wheel, thus increasing the braking force on said wheel. Herein, increasing brake pressure at one or more wheels via ABS 191 may be referred to as activating one or more wheel brakes.

One or more tire pressure monitoring sensors (TPMS) may be coupled to one or more tires of wheels in the vehicle. For example, FIG. 2 shows a tire pressure sensor 199 coupled to wheel 135 and configured to monitor a pressure in a tire 136 of wheel 135. While not explicitly illustrated, it may be understood that tire pressure sensor 199 may be in electrical communication with controller 12, so that controller 12 may be updated as to the tire pressure of the wheel(s) of the vehicle.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 may be communicatively coupled to other vehicles or infrastructures using appropriate communications technology, as is known in the art. For example, controller 12 may be coupled to other vehicles or infrastructures via a wireless network 170, which may comprise Wi-Fi, Bluetooth, a type of cellular service, a wireless data transfer protocol, and so on. Controller 12 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, V2I, or V2I2V, to extend the coverage area by a few miles. In still other examples, vehicle controller 12 may be communicatively coupled to other vehicles or infrastructures via wireless network 170 and the internet (e.g. cloud), as is commonly known in the art.

System 200 may also include an on-board navigation system 171 (for example, a Global Positioning System) that an operator of the vehicle may interact with. The navigation system 171 may include one or more location sensors for assisting in estimating vehicle speed, vehicle altitude, vehicle position/location, etc. This information may be used to infer engine operating parameters, such as local barometric pressure. As discussed above, controller 12 may further be configured to receive information via the internet or other communication networks. Information received from the GPS may be cross-referenced to information available via the internet to determine local weather conditions, local vehicle regulations, etc. In some examples, system 200 may include onboard navigation sensors (e.g., lasers, radar, sonar, acoustic sensors, onboard cameras, etc.) 172, which may enable vehicle location, traffic information, etc., to be collected via the vehicle.

System 200 may further include a human machine interface (HMI) 173, positioned for example at a dashboard in a cabin of the vehicle (e.g., vehicle 150 at FIG. 1). The HMI may be used to display relevant information to an operator of the vehicle, and the operator may interact with the HMI in order to control various aspects of vehicle system operation.

Turning now to FIG. 3, processor 212, stability control 204, airbag system 208, and longitudinal acceleration sensor 210 are shown in further detail. The system 200 may include various sensors, in addition to the one or more longitudinal acceleration sensors 202, 206, 210. For example, a wheel position sensor 300, an accelerator position sensor 302, a lateral acceleration sensor 304, and a vehicle yaw sensor 306 may be coupled to the processor 212. The accelerator position sensor 302 may be the same, or different than the pedal sensor 134 discussed above.

In the present example, an additional longitudinal acceleration sensor 206 is included as part of an airbag system 208 for the vehicle 150. Another longitudinal acceleration sensor 210 may be added to the vehicle 150. Each of the longitudinal sensors may be coupled with a processor 212.

In the present example, the processor 212 includes a logic unit 214. The processor 212 may also include an input/output module 216 configured to receive a signal from the longitudinal acceleration sensor and configured to pass the signal to the logic unit 214.

As discussed above, the controller (e.g., controller 12 at FIG. 2) may broadcast and receive information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Turning now to FIG. 4, an example illustration 400 is shown depicting one example of how a vehicle 405 (e.g., same as vehicle 150 at FIG. 1) may be in wireless communication with infrastructure that includes traffic lights. Said another way, example illustration 400 depicts a smart traffic light 410 in wireless communication 415 with vehicle 405. Smart traffic light 410 may communicate to vehicle 405 a status of smart traffic light 410. For example, smart traffic light 410 may communicate to vehicle 405 how much time is remaining until the light changes from red to green. In another example, smart traffic light 410 may communicate to vehicle 405 how much time is remaining until the light changes from green to red. As will be discussed in detail below, such capability may be used in order to infer whether to rely on a vehicle deceleration event to a vehicle stop to determine an offset or calibration factor between vehicle speed as measured by wheel speed sensor(s) (e.g., wheel speed sensors 192 at FIG. 2) and vehicle speed as determined based on integrating data from one or more longitudinal acceleration sensor(s) (e.g., longitudinal acceleration sensor 210 at FIG. 2).

Example illustration 400 thus includes vehicle 405, traveling along road 420. Depicted is traffic signal controller 425. Traffic signal controller may transfer information via wired communication 426 on traffic signal phase (e.g. whether the signal is green, yellow or red, duration of time until light changes, etc.), to roadside unit 430. Roadside unit 430 may then broadcast (e.g. wireless communication 415) or transmit such information to vehicle 405, where it may be processed via the controller (e.g. controller 12 at FIG. 2). As depicted, the transfer of information between traffic signal controller 425 and roadside unit 430 is via wired communication 426, although in other embodiments such communication may be wireless, without departing from the scope of this disclosure. A traffic management center 435 may collect and process data related to traffic information and/or vehicle information. For example, cables 440 (e.g. fiber optics cables) may communicatively connect traffic signal controller 425 with traffic management center 435, and traffic management center 435 may further be in wireless communication with vehicle 405 (and other vehicles which are not shown in illustration 400). While cables 440 are depicted as providing the communication of information between traffic signal controller 425 and traffic management center 435, it may be understood that in other examples such communication may comprise wireless communication, without departing from the scope of this disclosure. Furthermore, traffic management center 435 may comprise one of a local or state back office, private operator, etc.

While not explicitly illustrated, it may be understood that a one or more vehicles in front of vehicle 405 may be either already stopped at traffic light 410, or may come to a stop at the traffic light. This may impact where vehicle 405 stops with respect to the traffic light. For example, if there are three cars ahead of vehicle 405, then a stopping position for vehicle 405 may differ as compared to a situation where there are no cars ahead of vehicle 405. Thus, in some examples as discussed in further detail herein, vehicle 405 may determine via V2V communication and/or via the use of onboard navigation sensor(s) how many cars are ahead of the vehicle when coming to a stop. Such information may be useful for determining whether conditions are met for determining the offset or calibration factor between vehicle speed as measured by wheel speed sensors and vehicle speed as determined based on integrating data from one or more of the longitudinal acceleration sensors, discussed in further detail below.

Turning now to FIG. 5, depicted is a high-level example method 500 for determining a slope error between vehicle velocity data acquired/determined from a longitudinal acceleration sensor (e.g., longitudinal acceleration sensor 210 at FIG. 2) and data acquired from wheel speed sensor(s) (e.g., wheel speed sensor(s) 192 at FIG. 2) during a vehicle acceleration event. A calibration factor based on the slope error may be used to update a relevant vehicle parameter, such as tire size, final drive ratio, etc. Specifically, longitudinal acceleration sensor data may be integrated to obtain vehicle speed, and the vehicle speed inferred from the longitudinal acceleration sensor data may be compared to vehicle speed inferred from the wheel speed sensor data. The slope error between the vehicle speed data acquired via integrating the longitudinal acceleration sensor data and the vehicle speed data acquired via the wheel speed sensor(s) may be used to update the relevant vehicle parameter. For example, a lookup table may provide a particular calibration factor for a particular slope error, and the calibration factor may be used to update the relevant vehicle parameter.

Method 500 will be described with reference to the systems described herein and shown in FIGS. 1-4, though it should be understood that similar methods may be applied to other systems without departing from the scope of this disclosure. Method 500 may be carried out by a controller, such as controller 12 at FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-4. The controller may employ vehicle system actuators to alter states of devices in the physical world according to the methods depicted below.

Method 500 begins at 505, and includes indicating whether the vehicle is completely stopped. If not, method 500 proceeds to method 600, which will be discussed in greater detail below with regard to FIG. 6. The vehicle being stopped may be inferred based on data received at the controller from wheel speed sensor(s) (e.g., wheel speed sensors 192 at FIG. 2), data received at the controller from the onboard navigation system (e.g., onboard navigation system 171 at FIG. 2) and/or data received at the controller from the navigation sensors (e.g., navigation sensors 172 at FIG. 2).

Responsive to an indication that the vehicle is completely stopped but is in operation (e.g., the vehicle is on, and operating in a combusting mode of engine operation, an electric mode of operation, or some combination), method 500 proceeds to 510. At 510, method 500 includes recording baseline wheel speed and baseline longitudinal acceleration sensor output. In some examples, an offset associated with the longitudinal acceleration sensor may be calibrated while the vehicle is fully stopped. In other examples, an offset may be calibrated in other manners as appreciated by one skilled in the art, such that there is no inherent offset associated with the longitudinal acceleration sensor for conducting the method of FIG. 5. In other words, any offsets may be compensated for in order to conduct the methodology of FIG. 5 (and FIG. 6). Proceeding to 515, method 500 includes indicating whether vehicle velocity has increased, or in other words, whether vehicle velocity has increased to greater than 0 mph, for example. Furthermore, while not explicitly illustrated, it may be understood that at 515, the controller may further determine whether the vehicle velocity has increased via the vehicle moving in a forward direction, as opposed to a reverse direction. While not explicitly illustrated at FIG. 5, it may be understood that in a case where vehicle velocity has increased due to the vehicle moving in reverse, method 500 may be aborted. As mentioned above, a first reference point may comprise when a speed of the vehicle is indicated to first increase any amount above 0 mph.

If, at 515, an increase in vehicle velocity from the standstill is not indicated, method 500 proceeds to 520. At 520, method 500 includes maintaining current vehicle operating parameters. In some examples, the vehicle may be shut down during the time that the vehicle is stopped, at which point method 500 may be aborted. However, in other examples the vehicle may be maintained stopped for some time before being accelerated from the standstill. Accordingly, at 520, method 500 includes maintaining current vehicle operating parameters provided that the vehicle is not turned off, and the controller continues to judge whether the vehicle speed has increased from the standstill. It may be understood that a stop-start event where the engine is shut down but where the vehicle is maintained on may not constitute a vehicle-off event.

In response to an indication that vehicle speed has increased from the standstill, method 500 proceeds to 525. At 525, method 500 includes starting a timer, for example a timer that increases over time from a zero starting point reference. At 525, method 500 further includes integrating data received at the controller from the longitudinal acceleration sensor. It may be understood that the integration of acceleration data provided to the controller via the longitudinal acceleration sensor may yield vehicle velocity. The data being received at the controller by way of the longitudinal acceleration sensor may be understood to be integrated continually in some examples (e.g., as the data is received). In other examples, data may be integrated at particular predetermined intervals (e.g., every 3 seconds, every 5 seconds, etc.). In some examples where the vehicle includes more than one longitudinal acceleration sensor (refer to FIG. 3, for example), method 500 may include selecting a particular longitudinal acceleration sensor to use. In one example, the selecting may be based on an indication that a particular longitudinal acceleration sensor is not functioning as desired or expected, whereas another longitudinal acceleration sensor is operating as expected or desired. In another related example, a particular longitudinal acceleration sensor may be excluded from use for method 500 responsive to an indication that there is an offset associated with the particular longitudinal acceleration sensor, which cannot be readily compensated.

Furthermore, at 525, method 500 includes collecting data from the wheel speed sensor(s) (e.g., wheel speed sensors 192 at FIG. 2). It may be understood that integration of the longitudinal acceleration sensor data may provide a vehicle speed that increases over time. Along similar lines, the data acquired from the wheel speed sensors may provide a vehicle speed that increases over time as the vehicle accelerates from the stand-still.

Proceeding to 530, method 500 includes monitoring vehicle velocity. As one example, vehicle velocity may be measured via the wheel speed sensor(s). Additionally or alternatively, vehicle velocity may be measured/inferred based on the integrated longitudinal acceleration sensor data. Additionally or alternatively, vehicle velocity may be inferred via use of the onboard navigation system. For example, because the method of FIG. 5 is being used to infer whether the vehicle velocity as determined via wheel speed sensor(s) is consistent with vehicle velocity as determined via integration of longitudinal acceleration sensor data, it may be desirable in some examples to have an independent measurement of vehicle velocity for determining when to stop acquiring data from the longitudinal acceleration sensor and the wheel speed sensor(s) for use in determining the slope error for calibration purposes. It is herein recognized that such an independent measurement may be provided via the onboard navigation system, in some examples.

Proceeding to 535, method 500 includes indicating whether vehicle velocity is both greater than a first velocity threshold but less than a second velocity threshold and that the time (as monitored via the timer) since the vehicle began accelerating from the standstill is greater than a first time threshold but less than a second time threshold. It may be understood that a second reference point includes when the conditions of step 535 (and in some examples step 555 as well, discussed below) are met.

Figure 7A:
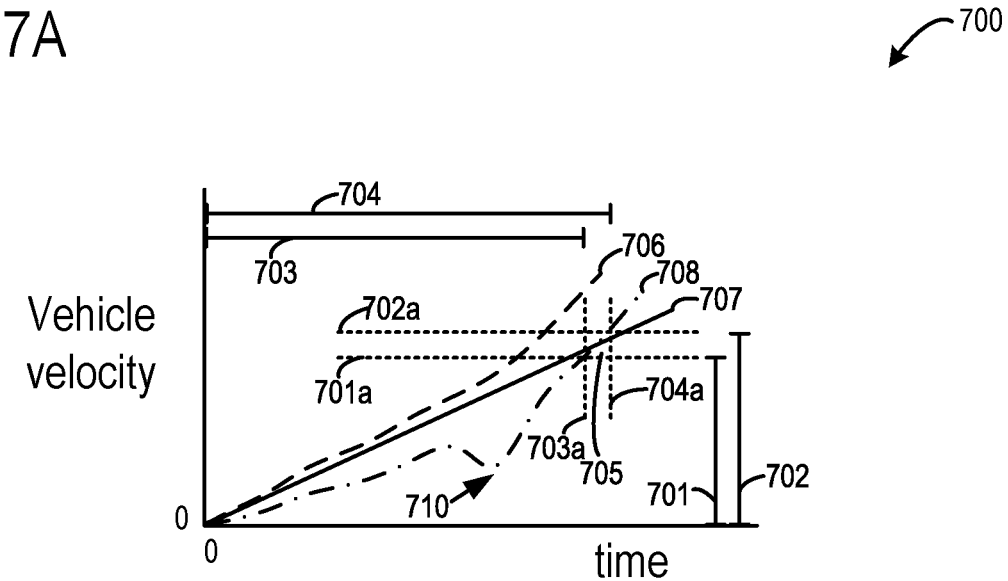
FIGS. 7A-7B schematically illustrate how a controller of the vehicle determines whether longitudinal accelerometer data and wheel speed sensor data meets predetermined criteria for use with the methodology of FIG. 5 and FIG. 6.

Turning now to FIG. 7A, the conditions defining steps 505-535 of method 500 are depicted illustratively via graph 700. Graph 700 depicts vehicle velocity (y-axis) as a function of time (x-axis). Line 701 depicts the first velocity threshold, and line 702 depicts the second velocity threshold. Furthermore, line 703 depicts the first time threshold, and line 704 depicts the second time threshold. Dashed lines 701a, 702a, 703a and 704a are shown as extensions of thresholds 701, 702, 703 and 704, respectively, to illustrate area 705 that is defined by each of the four thresholds. Further depicted are plots 706, 707 and 708, each of which illustrate different vehicle acceleration profiles from a standstill. It may be understood that the conditions of step 535 of FIG. 5 may be met responsive to vehicle speed as a function of time being within area 705, defined by each of the four thresholds discussed above.

Plot 706 depicts a situation where vehicle velocity exceeds both the first velocity threshold 701 and the second velocity threshold 702 prior to the first time threshold 703 being reached. Accordingly, plot 706 represents a situation where the conditions of step 535 of FIG. 5 cannot be met. Alternatively, each of plots 707 and 708 depict vehicle acceleration profiles for which conditions at step 535 of method 500 may be met. Specifically, for each of plot 707 and 708, vehicle velocity is greater than the first velocity threshold (line 701) but less than the second velocity threshold (line 702) at a time since the start of vehicle acceleration that is greater than the first time threshold (line 703) but less than the second time threshold (line 704).

Accordingly, returning to 535 of method 500 at FIG. 5, in a case where the requirements of step 535 are not met, method 500 proceeds to 540. At 540, method 500 judges whether conditions are met for aborting the method. Conditions may be met for aborting the method when the vehicle controller determines that the manner in which the vehicle is being accelerated cannot possibly satisfy the conditions of step 535. One such example includes plot 706 at FIG. 7A. However, there are other examples where the conditions of step 535 of FIG. 5 may not be met, but where the conditions still may be met eventually. Such examples may include situations where neither the first time threshold nor the first velocity threshold have been reached, and the vehicle is still accelerating from the standstill.

Accordingly, if at 540, it is indicated that abort conditions are not met, method 500 continues to query as to whether the conditions of step 535 are met. Alternatively, responsive to abort conditions being met at 540, method 500 proceeds to 545. At 545, method 500 includes aborting the method. For example, aborting the method may include discontinuing the integration of longitudinal acceleration sensor data, and discarding the data acquired since the vehicle acceleration began. Method 500 may then proceed to 550, where operating parameters are updated. Updating operating parameters may include setting a flag to indicate that method 500 was attempted but was aborted. In some examples, the flag may include additional details as to the reason for the methodology being aborted. In some examples, updating operating parameters may include updating a schedule for re-initiating method 500. For example, the controller may prioritize running method 500 again as soon as conditions are met for doing so, given that the method was aborted. Method 500 may then end.

Returning to 535, responsive to the conditions of step 535 having been satisfied, method 500 proceeds to 555. At 555, method 500 includes indicating whether the acceleration was monotonic since the time since the timer was started, until the time when the conditions of step 535 were indicated to be satisfied. Returning to graph 700 at FIG. 7A, while plot 708 is shown to satisfy the conditions of step 535, the vehicle acceleration was not monotonic. Specifically, arrow 710 at FIG. 7A points to where vehicle velocity substantially decreases prior to again increasing. Thus, for plot 708, although the conditions of step 535 of FIG. 5 are satisfied, because the acceleration was not monotonic, the method may not continue. Alternatively, plot 707 depicts a situation where the conditions of step 535 of FIG. 5 are met, and also where the acceleration was monotonic since the vehicle began accelerating. In some examples, step 555 may be satisfied when the accelerating is monotonic and substantially linear (e.g., slope does not change by greater than 1%, 2%, 3%, 5%, etc., throughout the acceleration from standstill), such as is observed via plot 707 at FIG. 7A.

Accordingly, in a situation where the acceleration is not monotonic, method 500 proceeds to 545, where the method is aborted. Proceeding to 550, method 500 includes updating operating parameters, which may include setting a flag to indicate that the method of FIG. 5 was aborted. In some examples, the reason (non-monotonic acceleration) for the method being aborted may be further stored. Similar to that discussed above, step 550 may include updating a schedule for conducting method 500, due to the methodology having been aborted. Method 500 may then end.

Returning to 555, responsive to an indication that the vehicle acceleration was monotonic, method 500 proceeds to 560. At 560, method 500 includes calculating a slope error between vehicle speed inferred from the integrating of the longitudinal accelerometer data, and the vehicle speed inferred from the wheel speed sensor data. More specifically, vehicle velocity data acquired via integrating the longitudinal acceleration sensor data may be fit to a linear equation, and vehicle velocity data acquired from the wheel speed sensor(s) may be fit to another linear equation, and a slope for each fit line may be determined. A difference in slope may comprise the slope error.

For a more thorough understanding of how the slope error may be determined, we turn to FIG. 8. FIG. 8 depicts graph 800, plotting vehicle speed inferred from the longitudinal acceleration sensor (y-axis) against vehicle speed measured via the wheel speed sensor(s) (x-axis). Specifically, plot 805 depicts a situation where the slope is equal to one. In such an example, it may be understood that vehicle speed as measured via the integration of longitudinal acceleration sensor data matches up with vehicle speed as measured via the wheel speed sensor(s), since the slope is equal to one. Said another way, a ratio of the slopes corresponding to vehicle speeds acquired from both methodologies is equal to 1, or in other words, are the same. Alternatively, plot 806 depicts a situation where the slope is greater than one, and plot 807 depicts a situation where the slope is less than one. In a situation such as that depicted by plot 806, it may be understood that vehicle speed as inferred by the longitudinal acceleration sensor data is faster than that determined via the wheel speed sensor(s) (e.g., slope is greater than 1). In a situation such as that depicted by plot 807, it may be understood that vehicle speed as inferred by the longitudinal acceleration sensor data is slower than that determined via the wheel speed sensor(s) (e.g., slope is less than 1). As an example, in a case where the wheel speed sensor(s) indicate a vehicle speed that is slower than that inferred based on the longitudinal acceleration sensor data (e.g., plot 806), the vehicle operator may have changed tire diameter to a larger diameter (or over-inflated the tires, etc.), such that for each revolution of the wheel the vehicle is actually traveling a greater distance than inferred via the wheel speed sensor(s). As another example, in a case where the wheel speed sensor(s) indicate a vehicle speed that is greater than that inferred based on the longitudinal acceleration sensor data (e.g., plot 807), the vehicle operator may have changed tire diameter to a smaller diameter (or deflated the tires, worn tires down, etc.), such that for each revolution of the wheel the vehicle is actually traveling a lesser distance than inferred via the wheel speed sensor(s).

Thus, depending on an extent or magnitude of deviation from a slope of one responsive to plotting wheel speed measured from wheel speed sensor(s) against wheel speed as inferred from a longitudinal acceleration sensor, it may be possible to infer whether tire diameter has changed, for example. Specifically, a lookup table may be queried using the determined slope error, in order to retrieve a calibration factor that relates to the extent of deviation from a slope of one. The calibration factor may be used to update a relevant vehicle parameter, for example tire diameter or circumference, final drive ratio, etc. In some examples, rather than updating the relevant vehicle parameter, a calculation that is used to determine vehicle speed from the wheel speed sensor data may be correspondingly updated, such that the actual speed reported to the vehicle operator accurately reflects vehicle speed measured by the wheel speed sensor(s).

Accordingly, returning to step 560 at FIG. 5, it may be understood that calculating the slope error between vehicle speed inferred from the longitudinal acceleration sensor may include first acquiring vehicle velocity data over time based on both integrated longitudinal acceleration sensor data and wheel speed sensor data. For each acquired data set, the acquired data may be fit via an appropriate linear equation, such that slope for each acquired data set may be determined. Then, the slopes may be plotted against one another as indicated at FIG. 8, such that a slope difference, also referred to herein as a slope error, may be inferred. As yet another example, calculating the slope error between vehicle speed inferred from the longitudinal acceleration sensor and vehicle speed determined via wheel speed sensor data may include determining a least square error of the two speed signals.

With the slope error inferred at 560, method 500 proceeds to 565. At 565, method 500 may include updating a relevant vehicle parameter to correct for the slope error. Updating the relevant vehicle parameter may include maintaining the current parameter in some examples where the slope error is determined to be 1 (or within a predetermined threshold of 1). Alternatively, updating the relevant vehicle parameter may include changing the relevant vehicle parameter when the slope error differs from 1 by more than the predetermined threshold. For example, by updating the relevant vehicle parameter (e.g., tire size), the calculation for determining vehicle speed based on the wheel speed sensor(s) may be used to infer an accurate actual vehicle speed. Method 500 may then end. While step 565 is depicted as updating the relevant vehicle parameter, it may be understood that in some examples the methodology of FIG. 5 may have to be conducted more than one time, for example a predetermined number of times, before the relevant vehicle parameter is updated, as will be discussed in greater detail below.

Returning to step 505, responsive to an indication that the vehicle is not stopped, but instead is in operation and traveling at a speed greater than stopped, method 500 proceeds to method 600.

Figure 6:
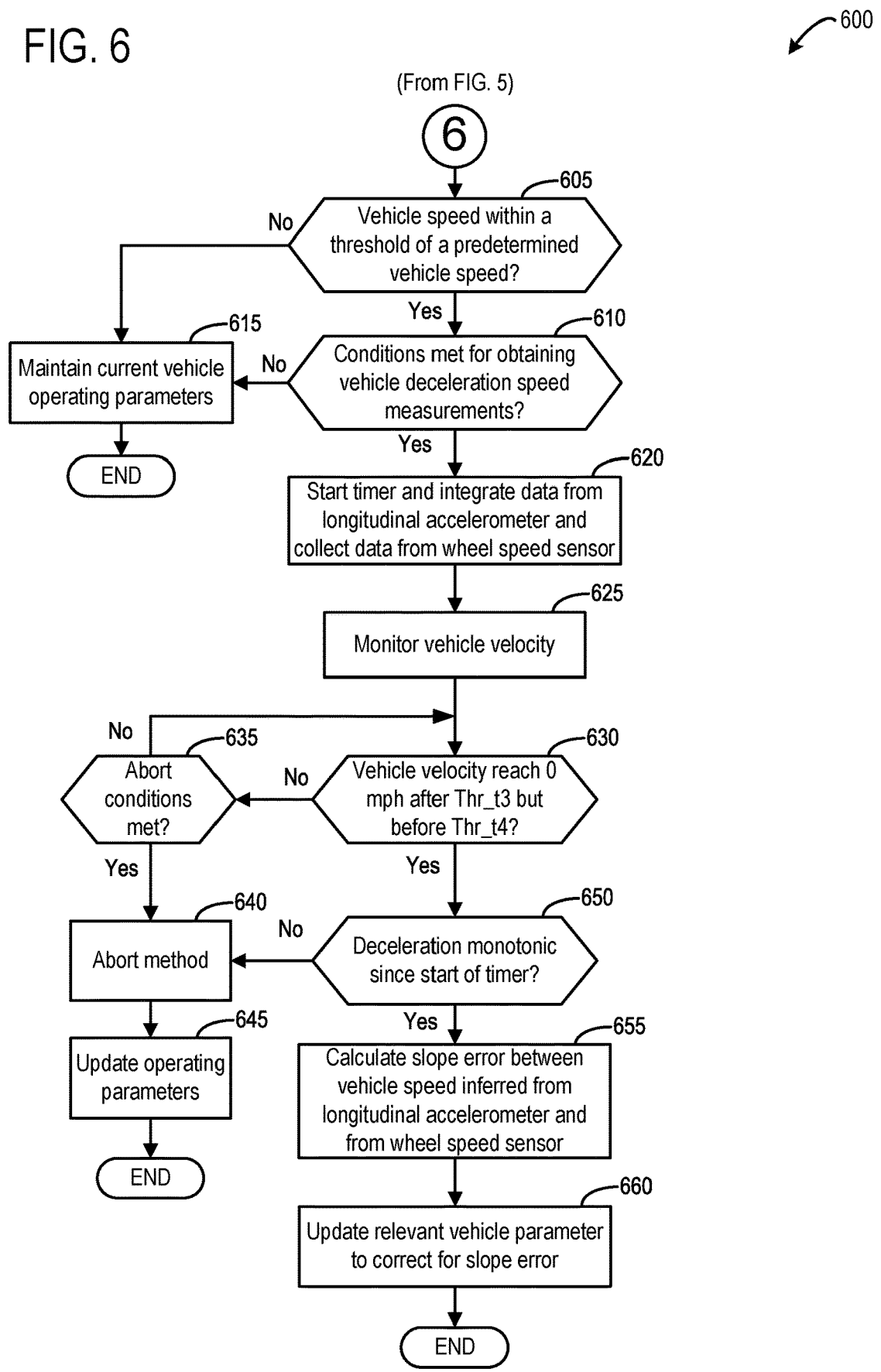
FIG. 6 depicts a high-level example method for determining a slope error between vehicle speed inferred from the longitudinal accelerometer and from wheel speed sensor(s), responsive to a deceleration event.

Turning now to FIG. 6, example method 600 proceeds from method 500. Briefly, method 600 represents a method for determining a slope error between data acquired from the longitudinal acceleration sensor and data acquired from wheel speed sensor(s) during a vehicle deceleration event from a first reference point to a second reference point, where the second reference point is when the vehicle comes to a complete stop. Similar to that discussed above at FIG. 5, a calibration factor based on the slope error may be used to update a relevant vehicle parameter, such as tire size, final drive ratio, etc. As method 600 proceeds from method 500, it may be understood that method 600 is described below with reference to the systems described herein and shown in FIGS. 1-4. Method 600 may be carried out by a controller, such as controller 12 at FIG. 2, and may be stored at the controller as executable instructions in non-transitory memory. Instructions for carrying out method 600 may be executed by the controller based on instructions stored on a memory of the controller and in conjunction with signals received from sensors of the vehicle system, such as the sensors described above with reference to FIGS. 1-4. The controller may employ vehicle system actuators to alter states of devices in the physical world according to method 600.

Method 600 begins at 605, and includes indicating whether vehicle speed is within a threshold of a predetermined vehicle speed. The predetermined vehicle speed, and in turn the threshold of the predetermined vehicle speed, may be based on a speed for which the vehicle coming to a stop from the predetermined speed may yield longitudinal acceleration sensor data that is accurate and does not exhibit stack-up errors, provided that the vehicle decelerates to a stop within a predetermined time frame, as will be elaborated in greater detail below.

If, at 605, it is indicated that vehicle speed is not within a threshold of the predetermined vehicle speed, method 600 proceeds to 615. At 615, method 600 includes maintaining current vehicle operating parameters. For example, the vehicle may be continued to operate without conducting methodology to determine whether wheel speed sensor(s) are accurately reporting vehicle speed. Method 600 may then end.

Returning to 605, in response to an indication that vehicle speed is within the threshold of the predetermined vehicle speed, method 600 proceeds to 610. At 610, method 600 includes indicating whether conditions are met for obtaining vehicle speed measurements during deceleration of the vehicle. There may be a number of ways in which conditions may be met at step 610, which are elaborated below.

As one example, conditions may be met at 610 responsive to an indication received at the controller that there is a traffic light ahead, and furthermore in response to an indication that it is inferred that the traffic light is expected to stay red (or change from green to red) such that the vehicle is predicted to have to stop at the traffic light. In such an example, it may be understood that conditions being met may further include an indication that the vehicle is within a predetermined distance of coming to a full stop. The predetermined distance may be set such that the vehicle comes to a stop in a manner expected to yield robust longitudinal acceleration sensor data during the decelerating of the vehicle. For example, a distance that is too short may result in a quick vehicle stop where inertial forces may skew integration results from data acquired via the longitudinal acceleration sensor. As another example, a distance that is too long may result in stack-up errors over time due to integrating acceleration sensor data over a longer than desired period of time. It may be understood that the inference that there is a traffic light ahead may be communicated to the vehicle controller via a smart traffic system, such as the smart traffic system depicted at FIG. 4.

In some examples, it may be understood that there may be one or more other vehicles in front of the vehicle, which may too have to stop at the traffic light. In such a case, V2V communications and/or other navigational sensor(s) (e.g., navigational sensors 172 at FIG. 2) may be relied upon for inferring a distance until the vehicle is expected to stop at the light. In other words, one or more vehicles in front of the vehicle may impact the distance until the vehicle stops at the light. Thus, the controller of the vehicle may rely on V2V communications and/or other navigational sensors to infer how many vehicles are expected to stop at the traffic light prior to the vehicle coming to a stop at the light, and the controller may in turn determine whether the number of vehicles is expected to result in the vehicle coming to a stop outside of the predetermined distance mentioned above. If it is inferred that the vehicle will come to a stop outside of the predetermined distance, then conditions may not be met at 610. In another example, if it is inferred that the traffic light is inferred to turn green or stay green such that the vehicle is not expected to stop at the light, then conditions may not be met at 610.

In some examples, it may be understood that the vehicle may have to come to a stop in a situation that does not involve a traffic light. One example may include stop-and-go traffic. In such an example, the controller of the vehicle may rely on V2V communications and/or vehicle-to-infrastructure (V2I) and/or vehicle-to-infrastructure-to-vehicle (V2I2V) communications to, along similar lines as that discussed above, infer whether the vehicle is expected to come to a stop within the predetermined distance, from a vehicle speed that is within the threshold of the predetermined vehicle speed.

As another additional or alternative example, the onboard navigation system may be relied upon for inferring whether conditions are met at 610. For example, based on information acquired over time via the onboard navigation system, certain routes traveled by the vehicle may be learned over time. The learned routes may include learned driving situations where the vehicle speed is within a threshold of the predetermined vehicle speed (refer to step 605 of method 600), and where the vehicle is within the predetermined distance from a learned stop location. For example, a vehicle operator may regularly stop the vehicle at home, in a manner that is amenable to the methodology of FIG. 6. In such an example, the vehicle controller may infer that when the vehicle is within the predetermined vehicle speed, conditions may be met for obtaining vehicle speed measurements during deceleration to a stop, provided that the vehicle is at a previously learned location (e.g., within a threshold distance of the learned stop) as indicated via the onboard navigation system.

It may be understood that conditions may not be met at 610 for a variety of reasons, even though vehicle speed may be within the threshold of the predetermined vehicle speed. For example, based on information retrieved by the controller via one or more of the smart traffic system, onboard navigation system, V2X communication, etc., the controller may make a determination that the vehicle is unlikely to come to a stop within the predetermined distance.

Thus, in summary, it may be understood that the controller may utilize one or more different methodologies including but not limited to reliance on a smart traffic system, reliance on V2X communications, reliance on the onboard navigation system, etc., in order to judge whether conditions are met for obtaining vehicle speed measurements during deceleration to a stop. Furthermore, in some examples, conditions may be met at 610 if it is inferred that the upcoming vehicle stop is predicted or learned to occur without the vehicle operator turning the vehicle, or in other words, if the steering wheel is predicted or learned to be held to within a predetermined angular position until the vehicle comes to the stop. For example, the methodology of FIG. 6 may be used when the deceleration to a stop does not include the vehicle turning, but instead driving straight ahead until the stop. Thus, conditions may be met at 610 in some examples responsive to an indication that the steering wheels is inferred to remain within a threshold angle of the predetermined position, where the predetermined position comprises a position for which the vehicle travels in a straight forward direction.

While the above discussion with regard to step 610 centered on the prediction or inference of situations where robust vehicle deceleration speed measurements may be obtained, as will be elaborated in greater detail below, it may be understood that in other examples conditions may be met at 610 without such a prediction or inference. For example, there may be situations where the controller requests that the methodology of FIG. 6 be conducted due to the methodology having not been conducted for a predetermined time period (e.g., 2 days, 3 days, 5 days, etc.). In such an example, the methodology of FIG. 6 may infer that conditions are met at 610 at any time when vehicle speed is within the threshold of the predetermined vehicle speed. Then, method 600 may proceed and can be aborted if the vehicle does not actually come to a stop, as will be discussed in further detail below.

If, at 610, conditions are not indicated to be met for obtaining vehicle speed measurements during deceleration of the vehicle, method 600 proceeds to 615, where current vehicle operating parameters are maintained, as discussed above. Method 600 may then end.

Alternatively, responsive to conditions being met at 610, method 600 proceeds to 620. At 620, method 600 includes starting the timer and integrating data from the longitudinal acceleration sensor, as well as collecting data from the wheel speed sensor(s), similar to that discussed at step 525 of method 500 above. Continuing to step 625, method 600 includes monitoring vehicle velocity, for example via the wheel speed sensor(s) and/or via the onboard navigation system, similar to that discussed above at step 530 of method 500.

Continuing to step 630, method 600 includes indicating whether the vehicle comes to a complete stop (e.g., 0 mph) after a third time threshold but before a fourth time threshold. The third time threshold and the fourth time threshold may be selected or determined based on the predetermined vehicle speed discussed above at step 605 (and in some examples the predetermined distance mentioned above with regard to step 610). Specifically, robust integration of the data collected via the longitudinal acceleration sensor may be expected (e.g., absence of stack-up errors) if the vehicle comes to a stop from the predetermined vehicle speed after the third time threshold but before the fourth time threshold.

Figure 7B:
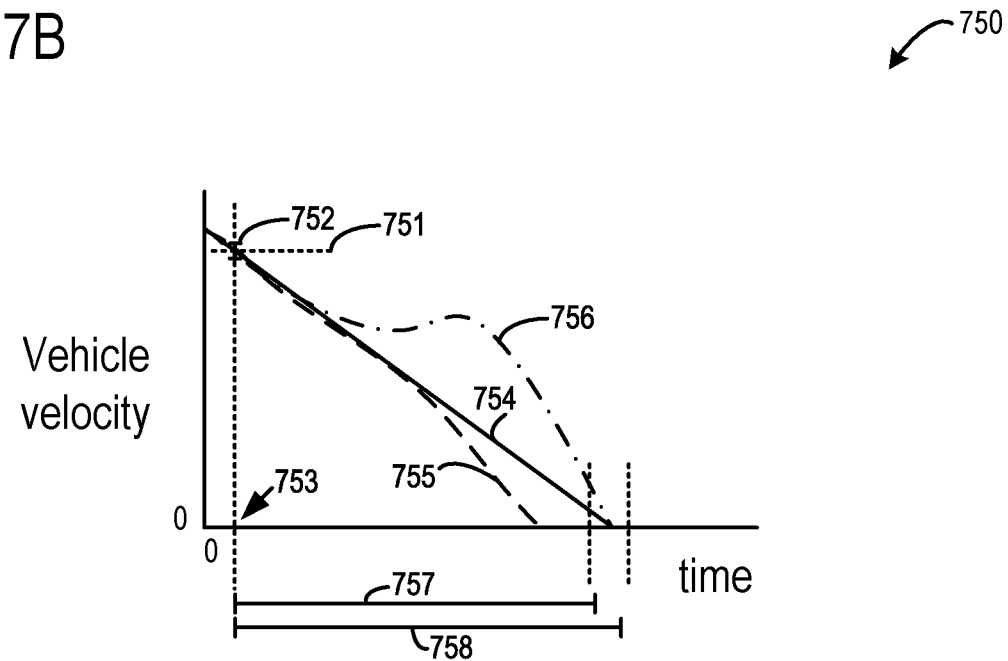

Turning now to FIG. 7B, the conditions defining steps 605-630 of method 600 are depicted illustratively via graph 750. Graph 750 depicts vehicle velocity (y-axis) as a function of time (x-axis). Line 751 depicts the predetermined vehicle speed (refer to step 605 of method 600), and line 752 illustrates the threshold with regard to the predetermined vehicle speed. Each of plots 754, 755, and 756 depict different vehicle deceleration profiles, which will be discussed in further detail below. It may be understood that, at the time represented by arrow 753, all of the plots 754, 755 and 756 represent vehicle speeds that are within the threshold (line 752) of the predetermined vehicle speed (line 751). Accordingly, it may be understood that the timer is started at the time represented by arrow 753, which may be understood to also correspond to a first reference point for the methodology of FIG. 6. The third time threshold is thus depicted by line 757, and the fourth time threshold is depicted by line 758 (refer to step 630 at FIG. 6).

Plot 755 shows an example deceleration scenario where the vehicle comes to a stop prior to the third time threshold being reached. In such an example, the data acquired from the longitudinal acceleration sensor and the wheel speed sensor(s) for use with the methodology of FIG. 6 may be discarded, and the methodology may be aborted. As another example, plot 756 shows an example deceleration scenario where the vehicle comes to a stop after the third time threshold and before the fourth time threshold. However, the deceleration was not monotonic as illustrated, and accordingly the data may similarly be discarded and the methodology of FIG. 6 aborted. As yet another example, plot 754 shows an example deceleration scenario where the vehicle comes to a stop after the third time threshold and before the fourth time threshold. Furthermore, plot 754 depicts an example deceleration scenario where the deceleration was monotonic from the time when the vehicle reached the predetermined vehicle speed, and the time when the vehicle comes to a stop. Thus, it may be understood that plot 754 depicts a situation where the conditions of step 630 at FIG. 6 are satisfied, and the methodology of FIG. 6 may proceed.

Accordingly, returning to step 630, if vehicle velocity does not stop after the third time threshold and before the fourth time threshold, method 600 proceeds to 635. At 635, method 600 includes indicating whether conditions are met for aborting the method. For example, if the vehicle is continuing to decelerate and the third time threshold has not yet been reached, method 600 may continue to assess whether the vehicle comes to a stop after the third time threshold and before the fourth time threshold. Alternatively, if the vehicle accelerates, for example to above the predetermined vehicle speed, then conditions may be met for aborting the method. In another example, if the vehicle stops prior to the third time threshold being reached (or after the fourth time threshold is exceeded), then conditions may be met for aborting the method. In response to abort conditions being met, method 600 proceeds to 640. At 640, method 600 includes aborting the method, which may include discarding the data collected with regards to the wheel speed sensor(s) and the longitudinal acceleration sensor. Method 600 then proceeds to 645, and includes updating vehicle operating parameters. Updating operating parameters may include setting a flag to indicate that method 600 was attempted but was aborted. In some examples, the flag may include additional details as to the reason for the methodology being aborted. In some examples, updating operating parameters may include updating a schedule for re-initiating method 600. For example, the controller may prioritize running method 600 again as soon as conditions are met for doing so, given that the method was aborted. Method 600 may then end.

Returning to 630, responsive to the vehicle coming to a stop after the third time threshold but before the fourth time threshold, method 600 proceeds to 650. At 650, method 600 includes indicating whether the deceleration was monotonic since the timer was started at step 620. If not, then method 600 proceeds to 640, where the method is aborted and operating conditions are updated in similar fashion as that discussed above. Alternatively, responsive to the deceleration being indicated to be monotonic since the start of the timer, method 600 proceeds to 655.

At 655, method 600 includes calculating a slope error between vehicle speed inferred from integration of the longitudinal accelerometer data, and the vehicle speed inferred from the wheel speed sensor data. While not explicitly illustrated, it may be understood that calculation of the slope error may be conducted in similar fashion as that discussed with regard to FIG. 5 and FIG. 8, with the exception being that the slope is negative due to the vehicle decelerating as opposed to accelerating. Briefly, vehicle speed inferred from the longitudinal acceleration sensor may be plotted against vehicle speed measured via the wheel speed sensor(s). If the slope ratio is 1 (or within a predetermined threshold of 1), then it may be understood that the data from the wheel speed sensor(s) matches up with vehicle speed as measured via the longitudinal acceleration sensor, and the current relevant vehicle parameter may be maintained without any updating. Or, in other words, the updating (refer to step 660), may include maintaining the current parameter. Alternatively, similar to that discussed above with regard to FIG. 8, a slope ratio that is greater than, or less than 1 (by more than the predetermined threshold) may indicate that the wheel speed sensor(s) are not accurately representing vehicle speed, either by overestimating vehicle speed or underestimating vehicle speed. Thus, in similar fashion as that discussed with regard to FIG. 8, based on the slope information gleaned from plotting the vehicle speed inferred from the longitudinal acceleration sensor against the vehicle speed inferred from the wheel speed sensor(s), the slope error may be determined, and a lookup table may be queried to obtain a calibration factor that is based on the slope error. The calibration factor may be used to update a relevant vehicle parameter, as discussed above.

Accordingly, with the slope error inferred at 655, method 600 proceeds to 660. At 660, method 600 includes updating a relevant vehicle parameter to correct for the slope error, as discussed. Method 600 then ends. Similar to that discussed above with regard to FIG. 5, while step 660 is indicated as updating the relevant vehicle parameter, it may be understood that in some examples the methodology of FIG. 6 may have to be conducted more than one time, or a plurality of times, prior to updating the relevant vehicle parameter, as discussed in further detail below.

Specifically, while each of method 500 and method 600 discussed above includes updating the relevant vehicle parameter to correct for the slope error, it may be understood that in some examples, the relevant vehicle parameter may be updated when conditions are met for doing so, and not necessarily any time that the method of FIG. 5 or the method of FIG. 6 is conducted. As one example, the relevant vehicle parameter may be updated when the methodology of FIG. 5 or FIG. 6 has been conducted a predetermined number of times. For example, the relevant vehicle parameter may be updated responsive to the method of FIG. 5 having been conducted 3 or more times within a predetermined duration (e.g., 2 days, 1 day, etc.). As another example, the relevant vehicle parameter may be updated responsive to the method of FIG. 5 having been conducted 3 or more times in a single drive cycle, or a within a predetermined number of drive cycles that occur within a predetermined time frame. Along similar lines, the relevant vehicle parameter may be updated responsive to the method of FIG. 6 having been conducted a predetermined number of times. For example, the relevant vehicle parameter may be updated responsive to the method of FIG. 6 having been conducted 3 or more times within a predetermined duration (e.g., 2 days, 1 day, etc.). As another example, the relevant vehicle parameter may be updated responsive to the method of FIG. 6 having been conducted 3 or more times in a single drive cycle, or within a predetermined number of drive cycles that occur within a predetermined time frame.

In a case where the methodology of FIG. 5 or the methodology of FIG. 6 is conducted a plurality (e.g., 3) of times prior to the relevant vehicle parameter being updated, it may be understood that the slope errors obtained each time the particular method is carried out may be averaged together to obtain a high confidence calibration factor retrieved from a lookup table.

While in some examples it may be desirable to rely on just the methodology of FIG. 5 for updating the relevant vehicle parameter, or just the methodology of FIG. 6, in other examples it is herein recognized that there may be a significant advantage to combining data from both the methodology of FIG. 5 and the methodology of FIG. 6 in order to update the relevant vehicle operating parameter. Specifically, confidence in a determination to update the relevant vehicle operating parameter may be increased by relying on data acquired via both the method of FIG. 5 and the method of FIG. 6, given that there may be slight differences in robustness of longitudinal acceleration sensor data between vehicle acceleration and deceleration events.

Accordingly, turning now to FIG. 9, a high-level example method 900 is shown for updating the relevant vehicle operating parameter as discussed herein, via the use of data collected via the methodology of FIG. 5 and the methodology of FIG. 6. Method 900 may be carried out by the controller (e.g., controller 12 at FIG. 2), and may be stored at the controller as executable instructions in non-transitory memory. Instructions for carrying out method 900 may be executed by the controller based on instructions stored on a memory of the controller and in conjunction with signals received from sensors of the vehicle system, such as the sensors described above with reference to FIGS. 1-4. The controller may employ vehicle system actuators to alter states of devices in the physical world according to the method.

Method 900 begins at 905, and includes indicating whether conditions are met for comparing data obtained via the method of FIG. 5 with that obtained via the method of FIG. 6. As one example, conditions may be met when method 500 has been effectively carried out one time and a slope error determined, and when method 600 has been effectively carried out one time and for which another slope error has been determined, within a predetermined duration (e.g., 1 day, 2 days, etc.) and/or a predetermined number of drive cycles (e.g., 1 drive cycle, two drive cycles, etc.). As another example, conditions may be met when method 500 has been effectively carried out a plurality of times (e.g., 3) and for which slope errors have been determined for each of the plurality of times, and when method 600 has been effectively carried out a plurality of times (e.g., 3) and for which additional slope errors have been determined. In such an example, it may be understood that the conditions may be met further responsive to all of the data being collected within a predetermined time duration (e.g., 1 day, 2 days, etc.) and/or a predetermined number of drive cycles (e.g., 1 drive cycle, 2 drive cycles, 3 drive cycles, 4 drive cycles, etc.). In an example where conditions are met when each of method 500 and method 600 have been carried out the plurality of times, it may be understood that slope errors acquired via method 500 may be averaged together to obtain a first averaged slope error, and slope errors acquired via method 600 may be averaged together to obtain a second averaged slope error.

Accordingly, if, at 905, conditions are not indicated to be met for comparing data obtained via the method of FIG. 5 and the method of FIG. 6, then method 900 proceeds to 910, where current operating conditions are maintained. The controller of the vehicle may attempt to gather more data when conditions are met for doing so, such that method 900 may be conducted, and the relevant vehicle operating parameter may be updated. Method 900 may then end.

Returning to 905, responsive to conditions being met for comparing data obtained via the method of FIG. 5 with that of FIG. 6, method 900 proceeds to 915. At 915, method 900 includes, via the controller, comparing the slope errors obtained via the method of FIG. 5 with those obtained via the method of FIG. 6. Proceeding to 920, method 900 includes indicating whether the slope errors obtained via the different methodologies are correlated with one another or not. Specifically, if the determined slope errors differ by more than a predetermined threshold amount (e.g., greater than 10%, greater than 15%, etc.), then method 900 proceeds to 925, where the data is discarded and the relevant vehicle operating parameter is maintained unchanged. Method 900 then proceeds to 930, where operating conditions are updated. Specifically, updating operating conditions may include setting a flag to indicate that the data obtained via the methodology of FIG. 5 did not correlate with the data obtained via the methodology of FIG. 6, and that as a result, the vehicle operating parameter is maintained unchanged. In some examples a malfunction indicator light may be illuminated at the vehicle dash, for example, to alert the vehicle operator of a request to have the vehicle serviced to resolve the discrepancy. Additionally or alternatively, in some examples the controller may update a schedule for acquiring additional data via the methodology of FIG. 5 and FIG. 6. Method 900 may then end.

Returning to 920, responsive to an indication that the data acquired via the method of FIG. 5 is correlated with the method of FIG. 6, method 900 proceeds to 935. At 935, method 900 includes determining whether the correlated slope errors are greater than a threshold slope error (e.g., the slope ratios differ from 1 by more than a threshold). If not, then method 900 proceeds to 940, and includes maintaining the current relevant operating parameter. Method 900 may then end. Alternatively, if at 935, it is indicated that the correlated slope errors are greater than the threshold slope error, then method 900 proceeds to 945. At 945, method 900 includes updating the relevant vehicle operating parameter based on the slope error determined via the methodology of FIG. 5 and FIG. 6. In some examples where the slope errors from FIG. 5 are correlated with that of FIG. 6, the slope errors may be averaged together, and then the relevant vehicle operating parameter may be updated based on the averaged slope error. Method 900 then ends.

Turning now to FIG. 10, depicted is a prophetic example timeline 1000, illustrating one example of how the methodology of FIG. 6 may be used to make a determination as to whether or not to update a relevant vehicle parameter (e.g., tire size, final drive ratio, etc.) in order to enable a more accurate representation of vehicle speed as inferred from wheel speed sensor data. Timeline 1000 includes plot 1005, indicating vehicle speed, over time. It may be understood that in this example timeline, vehicle speed may be inferred based on one or more of wheel speed sensor(s), the onboard navigation system, etc. The vehicle may either be stopped, or may be traveling at a speed greater than stopped. Timeline 1000 further includes plot 1010, indicating whether a predicted distance to an inferred vehicle stop point is within a threshold distance range of the vehicle's current position, over time. Timeline 1000 further includes plot 1015, indicating a predicted status of a traffic light at the inferred stop discussed above with regard to plot 1010, over time. The predicted light status may be red (R), yellow (Y) or green (G). Timeline 1000 further includes plot 1020, indicating whether conditions are met for acquiring data from the longitudinal acceleration sensor (e.g., longitudinal acceleration sensor 210), over time. Specifically, plot 1020 indicates whether conditions are met for beginning to integrate data acquired from the longitudinal acceleration sensor in order to determine vehicle speed as the vehicle decelerates to a stop. Timeline 1000 further includes plot 1025, indicating whether a timer of the vehicle has been started (on) or not (off), over time. Timeline 1000 further includes plot 1030, indicating whether conditions are met for estimating slope error between vehicle speed as measured via wheel speed sensor(s) and vehicle speed as inferred from the integration of longitudinal acceleration sensor data.

At time t0, the vehicle is traveling at a particular speed (plot 1005), and the vehicle speed is not within the threshold (represented by line 1006) of the predetermined vehicle speed discussed above at, for example, step 605 of FIG. 6. Accordingly, whether or not the distance to an inferred stop is within the threshold range, such information is not currently applicable (refer to plot 1010). Along similar lines, light status of an upcoming stop (refer to plot 1015) is not currently applicable, and conditions are not yet met for acquiring and integrating data from the longitudinal acceleration sensor in order to infer vehicle speed. Accordingly, the timer is off (plot 1025), and conditions are not met for slope error estimation (plot 1030).

Between time t0 and t1, vehicle speed decreases as the vehicle decelerates. At time t1, vehicle speed is within the threshold (line 1006) of the predetermined vehicle speed. Accordingly, with the vehicle speed within the threshold of the predetermined vehicle speed, the controller requests information as to whether it is inferred or expected/predicted that the vehicle will come to a stop within a threshold distance range of the current vehicle position. In this example timeline, as will be elaborated in greater detail below, the controller determines that it is expected that the vehicle will come to a stop within the threshold distance range. Such an assessment in this example timeline may be understood to be based on the vehicle controller acquiring information from a smart traffic system, such as the smart traffic system of FIG. 4. Specifically, once the vehicle speed is determined to be within the threshold of the predetermined vehicle speed, the controller sends a wireless request to the smart traffic system as to a status of an upcoming traffic light. For example, the controller receives an indication that the traffic light is currently yellow and is changing to red in one second, and is expected to stay red for one minute. The controller then assesses, for example in conjunction with one or more of the onboard navigation system, V2X communications, etc., whether the current speed of the vehicle and an estimated distance from the vehicle to the stop light are such that it is inferred that the vehicle will have to stop at the light. As discussed above with regard to FIG. 6, in some examples V2V communications and/or other onboard navigation sensors may be relied upon to infer how many other vehicles may be expected to also stop at the light ahead of the vehicle, as such a determination may impact a distance until the vehicle is expected to stop at the upcoming traffic light. In this example timeline 1000, as depicted via plot 1015, it is predicted that the light will be red when the vehicle comes to a stop within the threshold distance range of the current vehicle position. Accordingly, taken together, conditions are indicated to be met at time t1 for acquiring and integrating longitudinal acceleration sensor data for the purposes of comparing an estimate of vehicle speed based on the longitudinal acceleration sensor to another estimate of vehicle speed based on wheel speed sensor(s) (refer to plot 1025).

Accordingly, at time t1, the controller starts a timer (plot 1025) in order to monitor how long it takes for the vehicle to come to a stop at the light. Between time t1 and t2, the vehicle continues to decelerate in a monotonic fashion, and accordingly, conditions remain met for acquiring and integrating data retrieved from the longitudinal acceleration sensor, and there are no changes that impact the determination that the vehicle is expected to stop within the threshold distance range from the point when the vehicle speed first became within the threshold of the predetermined vehicle speed (e.g., at time t1). Accordingly, it may be understood that between time t1 and t2, the controller retrieves data from the wheel speed sensor(s) and from the longitudinal acceleration sensor, where data from the longitudinal acceleration sensor is integrated to determine vehicle speed during the vehicle deceleration routine.

At time t2, the vehicle comes to a complete stop. The complete stop occurs after the third time threshold represented by line 1026, and before the fourth time threshold represented by line 1027 (refer to step 630 of FIG. 6). Accordingly, conditions are indicated to be met for determining the slope error estimation between vehicle speed data acquired from the wheel speed sensor(s) and vehicle speed data acquired via the integration of data from the longitudinal acceleration sensor. The methodology for determining the slope error estimation in order to potentially update a relevant vehicle parameter such as tire size or final drive ratio, has been discussed above and will not be reiterated here with respect to example timeline 1000. However, it may be understood that in some examples the controller may directly use the data collected as discussed with regard to example timeline 1000 in order to determine whether to update the relevant vehicle parameter. Alternatively, in other examples the data obtained as discussed with regard to the timeline of FIG. 10 may be combined with one or more other sets of similarly acquired data, in order to determine whether to update the relevant vehicle parameter, for example as discussed with regard to FIG. 9 above.

In this way, actual vehicle speeds may be more accurately determined and communicated to an operator of a vehicle. This may improve customer satisfaction, and improve a number of operational aspects of the vehicle that rely on accurate vehicle velocity estimates.

The technical effect of relying on strict reference points that define boundaries of vehicle operation where vehicle velocity determinations based on integrating longitudinal acceleration sensor data may be obtained, is to improve accuracy of the vehicle velocity determinations from the longitudinal acceleration sensor data. Specifically, errors in such determinations may be expected if the conditions under which data is retrieved and integrated from the longitudinal acceleration sensor is not tightly controlled. Any errors may result in erroneous calibration, thus further deteriorating vehicle velocity determinations, which of course is undesirable. Accordingly, the technical effect of defining particular scenarios where wheel speed senor data and integrated longitudinal acceleration sensor data can update relevant vehicle parameter(s), is to avoid erroneous updates based on data that is inaccurate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   with a vehicle at a first reference point, commencing integrating data retrieved from a longitudinal acceleration sensor and a wheel speed sensor responsive to a speed of the vehicle being within a threshold of a predetermined non-zero speed and an indication that the vehicle is predicted to come to a full stop at a second reference point within a predetermined distance of the first reference point;
   obtaining a first vehicle velocity based on the integrated data retrieved from the longitudinal acceleration sensor and obtaining a second vehicle velocity based on the data retrieved from the wheel speed sensor responsive to the vehicle coming to the full stop at the second reference point;
   determining a slope error between the first vehicle velocity and the second vehicle velocity;
   updating a relevant vehicle parameter in response to the slope error being greater than a predetermined slope error; and
   updating a vehicle speed communicated to an operator via a human machine interface (HMI) based on the updated relevant vehicle parameters.

2. The method of claim 1, wherein the first reference point includes the vehicle just beginning to accelerate from a vehicle-stopped condition.

3. The method of claim 1, wherein the second reference point includes the vehicle coming to a complete stop after a first time duration but before a second time duration since the vehicle was traveling within the threshold of the predetermined non-zero vehicle speed.

4. The method of claim 1, further comprising discarding data pertaining to the first and the second vehicle velocity in response to acceleration or deceleration of the vehicle not being monotonic between an entirety of the first reference point and the second reference point.

5. The method of claim 1, wherein the relevant vehicle parameter is a tire diameter.

6. The method of claim 1, wherein the relevant vehicle parameter is a final drive ratio.

7. The method of claim 1, further comprising maintaining the relevant vehicle parameter unchanged when the difference is less than the threshold difference.

8. The method of claim 1, further comprising an indication that a steering wheel is maintained within a predetermined steering wheel angular range between the first reference point and the second reference point; and
   that a surface upon which the vehicle is traversing between the first reference point and the second reference point is within a predetermined threshold angle of a perfectly level surface.

9. A method for a vehicle, comprising:
   obtaining a first vehicle velocity profile based on integration of data retrieved from a longitudinal acceleration sensor and obtaining a second vehicle velocity profile based on data retrieved from a wheel speed sensor between a first reference point and a second reference point responsive to a speed of the vehicle being within a threshold of a predetermined non-zero vehicle speed and an indication that the vehicle is predicted to come to a full stop within a predetermined distance of the first reference point;
   obtaining a third vehicle velocity profile based on integration of data retrieved from the longitudinal acceleration sensor and obtaining a fourth vehicle velocity profile based on data retrieved from the wheel speed sensor between a third reference point and a fourth reference point;
   obtaining a first slope error between the first vehicle velocity profile and the second vehicle velocity profile, and obtaining a second slope error between the third vehicle velocity profile and the fourth vehicle velocity profile;
   updating a relevant vehicle parameter responsive to the first slope error and the second slope error each being greater than a predetermined threshold slope error and the first slope error and the second slope error being correlated within a predetermined percentage of each other; and
   updating a vehicle speed communicated to an operator via a human machine interface (HMI).

10. The method of claim 9, wherein the vehicle is accelerating from a standstill between the first reference point and the second reference point; and
   wherein the vehicle is decelerating to a stopped condition between the third reference point and the second reference point.

11. The method of claim 9, wherein the relevant vehicle parameter is one of a tire diameter and a final drive ratio of the vehicle.

12. The method of claim 9, further comprising updating the relevant parameter as a function of an average of the first slope error and the second slope error.

13. The method of claim 9, wherein obtaining the first and the second vehicle velocity profile includes fitting the data retrieved from the longitudinal acceleration sensor and the wheel speed sensor to a first and a second linear equation, respectively, in order to obtain a first slope and a second slope;
   wherein obtaining the third and the fourth vehicle velocity profile includes fitting the data retrieved from the longitudinal acceleration sensor and the wheel speed sensor to a third and a fourth linear equation, respectively, in order to obtain a third slope and a fourth slope; and
   wherein the first slope error is based on a ratio of the first slope and the second slope, and where the second slope error is based on another ratio of the third slope and the fourth slope.

14. A system for a vehicle comprising:
a longitudinal acceleration sensor;
a wheel speed sensor;
a human machine interface (HMI); and
a controller with computer readable instructions stored on non-transitory memory that when executed, cause the controller to:
   commence integrating data retrieved from the longitudinal acceleration sensor and retrieving data from the wheel speed sensor responsive to a speed of the vehicle being within a threshold of a predetermined non-zero vehicle speed and an indication that the vehicle is predicted to come to a full stop within a predetermined distance of a current location of the vehicle;
   obtain a first vehicle velocity profile based on the integrated data retrieved from the longitudinal acceleration sensor and obtain a second vehicle velocity profile based on the data retrieved from the wheel speed sensor responsive to the vehicle coming to the full stop;
   determine a slope error between the first vehicle velocity profile and the second vehicle velocity profile;
   update a relevant vehicle parameter in response to the slope error being greater than a predetermined slope error; and
   update a vehicle speed communicated to an operator via the HMI.

15. The system of claim 14, wherein the controller stores further instructions to wirelessly retrieve information pertaining to a status of an upcoming traffic light by way of a smart traffic system, for predicting that the vehicle is expected to come to the full stop within the predetermined distance of the current location of the vehicle.

16. The system of claim 14, wherein the controller stores further instructions to update the relevant vehicle parameter as a function of a magnitude of the slope error; and
   wherein the relevant vehicle parameter is one of a tire diameter and a final drive ratio.

17. The system of claim 14, wherein the controller stores further instructions to wirelessly retrieve information from one or more other vehicles in front of the vehicle, and relying on the information for predicting that the vehicle is expected to come to the full stop within the predetermined distance of the current location of the vehicle.

18. The system of claim 14, wherein the controller stores further instructions to obtain the first vehicle velocity profile and the second vehicle velocity profile responsive to the vehicle coming to the full stop at a time greater than a first threshold duration but less than a second threshold duration from a reference zero time point, the reference zero time point set when the speed of the vehicle is within the threshold of the predetermined non-zero vehicle speed.

* * * * *